United States Patent
Watanabe et al.

(10) Patent No.: US 8,532,053 B2
(45) Date of Patent: Sep. 10, 2013

(54) WIRELESS COMMUNICATION SYSTEM AND METHOD FOR ASSURING COMMUNICATION QUALITY OF PACKET FLOW

(75) Inventors: Koji Watanabe, Kokubunji (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1299 days.

(21) Appl. No.: 11/916,723

(22) PCT Filed: Jun. 10, 2005

(86) PCT No.: PCT/JP2005/010685
§ 371 (c)(1),
(2), (4) Date: Dec. 6, 2007

(87) PCT Pub. No.: WO2006/131981
PCT Pub. Date: Dec. 14, 2006

(65) Prior Publication Data
US 2009/0103454 A1    Apr. 23, 2009

(51) Int. Cl.
*H04W 4/00* (2009.01)

(52) U.S. Cl.
USPC ......................................................... 370/331

(58) Field of Classification Search
USPC ........................................ 370/235, 338, 352
See application file for complete search history.

(56) References Cited

U.S. PATENT DOCUMENTS

| | | | |
|---|---|---|---|
| 7,233,583 B2 * | 6/2007 | Asthana et al. | 370/332 |
| 7,330,453 B1 * | 2/2008 | Borella et al. | 370/338 |
| 7,657,634 B2 * | 2/2010 | Zheng et al. | 709/228 |
| 7,873,359 B2 * | 1/2011 | Lee et al. | 455/437 |
| 2002/0004379 A1 | 1/2002 | Gruhl et al. | |
| 2003/0129988 A1 | 7/2003 | Lee et al. | |
| 2004/0131078 A1 * | 7/2004 | Gupta et al. | 370/466 |
| 2006/0029096 A1 * | 2/2006 | Babbar et al. | 370/466 |
| 2006/0039346 A1 * | 2/2006 | Shapiro | 370/349 |

FOREIGN PATENT DOCUMENTS

| | | |
|---|---|---|
| JP | 2002-9841 A | 1/2002 |
| JP | 2002-247627 A | 8/2002 |
| JP | 2003-264878 A | 9/2003 |

OTHER PUBLICATIONS

3rd Generation Partnership Project 2 "3GPP2" X.P0011-003-D, v.5.
3rd Generation Partnership Project 2 "3GPP2" X.P0011-004-D, v.5.
3rd Generation Partnership Project 2 "3GPP2" X.31-20040629-xxx-Handoff Scenarios.
3rd Generation Partnership Project 2 "3GPP2", Qualcomm Incorporated, Jun. 2004.

* cited by examiner

*Primary Examiner* — Mark Rinehart
*Assistant Examiner* — Mohammad Anwar
(74) *Attorney, Agent, or Firm* — Mattingly & Malur, PC

(57) ABSTRACT

A base station or packet control apparatus, constituting a wireless access network system to be connected to an IP network via a node apparatus, includes a QoS authorization and admission control function for verifying a first communication quality request received from a wireless mobile station based on communication quality level information assured previously to the wireless mobile station, converting the request into a second communication quality request assured to the wireless mobile station, and converting the second communication quality request into a third communication quality request acceptable to communication resources of the wireless access network, and a QoS admission control function for converting, when a second or third communication quality request is received from another node apparatus connected to another wireless access network on account of handover of a wireless mobile station between node apparatuses, the received communication quality request into a communication quality request acceptable to the communication resources.

13 Claims, 16 Drawing Sheets

FIG. 15

QoS User Profile

| | |
|---|---|
| User ID | ~191 |
| Authorized Set ID | ~192 |
| Authorized Priority | ~193 |
| Authorized Aggregate BW | ~194 |

FIG. 16

QoS User Profile

| | |
|---|---|
| User ID | ~200 |
| Authorized Set ID | ~201 |
| Authorized Traffic class | ~202 |
| Authorized Priority | ~203 |
| Authorized Peak rate | ~204 |
| Authorized Max latency | ~205 |
| Authorized Max loss rate | ~206 |
| Authorized Max jitter | ~207 |
| Authorized aggregate BW | ~194 |

FIG. 17

PDSN table

| | |
|---|---|
| User ID | 210 |
| User QoS profile | 211 |
| RAA QoS | 212 |
| G QoS | 213 |

FIG. 18

BS/PCF table

| | |
|---|---|
| User ID | 215 |
| User QoS profile | 216 |
| RAA QoS | 217 |
| G QoS | 218 |

FIG. 19

AAA table

| | |
|---|---|
| User ID | 220 |
| User QoS profile | 221 |

WIRELESS COMMUNICATION SYSTEM AND METHOD FOR ASSURING COMMUNICATION QUALITY OF PACKET FLOW

TECHNICAL FIELD

This invention relates to a wireless communication system, and more particularly to a wireless communication system that facilitates QoS (Quality of Service) control when handover occurs between node apparatuses as a wireless mobile station moves, and a method for assuring communication quality of packet flow.

BACKGROUND ART

In a paper "Qualcomm, X31-20040607-018 R1, (Jul. 7, 2004)" (non-Patent Publication 1) of 3GPP2 (3rd Generation Partnership Project 2), a scenario to assure QoS (Quality of Service, communication quality) in a handover is disclosed. In option 3 of page 7 of the document, a proposal is disclosed in which a PDSN (Packet Data Serving Node) manages QoS information in a handover between RANs (Radio Access Networks). In the proposal, PDSN manages QoS (R QoS: Requested QoS) requested by a wireless terminal MS (Mobile Station) and assured QoS (G QoS: Granted QoS). However, an example of handover between PDSNs is not disclosed.

In the paper titled "Nokia, X31-20040629-003, (Jul. 29, 2004)" (non-patent 2) of 3GPP2 (3rd Generation Partnership Project 2), it is pointed out that there is room for optimization to send QoS information through an inter-PDSN interface (P-P interface) in a handover between PDSNs (page 2, lines 31 to 33). However, a specific example of QoS setting in a handover is not disclosed.

In the document titled "X.P0011-D-004, Rev0.5 (November, 2005)" (non-Patent Publication 3) of which standardization is being made in 3GPP2 (3rd Generation Partnership Project 2), a method of setting QoS in a wireless system is disclosed. In Annex.F of this document, a call flow that a mobile station MS requests QoS from a network and RAN admits it is disclosed.

In the document titled "X.P0011-D-003, Rev0.5 (November, 2005)" (non-Patent Publication 4) of which standardization is being made in 3GPP2 (3rd Generation Partnership Project 2), a P-P interface (inter-PDSN interface) is stipulated. An inter-PDSN handover using a P-P interface is disclosed in Chapter 4.

FIG. 1 shows a wireless communication system premised in this invention.

An IP network 1 is a core network of IP (Internet Protocol). PDSN 2 and PDSN 3 are node apparatuses connecting the IP network 1 with RAN (Radio Access Network) 4 and RAN 5, respectively. Since the PDSN 2 and PDSN 3 operate as a source and a target of handover, respectively, in the following description, a source PDSN will be represented as sPDSN and a target PDSN as tPDSN. The RAN 4 and RAN 5 are wireless access networks respectively connected with PDSN 2 and PDSN 3 by RAN-PDSN interface (R-P interface).

Since RAN 4 and RAN 5 serve as a source and a target of handover, respectively, as a mobile terminal (wireless mobile station) MS 10 moves, a source RAN is represented as sRAN, and a target RAN as tRAN. PCF (Packet Control Function) 6 and PCF are packet control apparatuses connected with PDSN 2 and PDSN 3, respectively, by a RAN-PDSN interface (R-P interface). Since PCF 6 and PCF 8 serve as a source and a target of handover, respectively, a source PCF is represented as sPCF 6, and a target PCF as tPCF 8.

BS (Base Station) 7 and BS 9 are base stations connected to PDSN 2 and PDSN 3, respectively. Since the BS 7 and BS 9 also serve as a source and a target of handover, respectively, a source BS is represented as sBS 7 and a target BS as tBS 9.

AAA server 11 is a user Authentication, Authorization and Accounting server connected with PDSN 2 and PDSN 3 via the IP network 1. In the following descriptions, it is assumed that handover between packet data serving nodes (PDSNs) occurs when the MS 10 moves from the BS 7 connected to the sPDSN 2 to the BS 9 connected to the tPDSN 3.

A PPP (Point to Point Protocol) session is set for communication between MS and PDSN. MS performs communication with PDSN by a plurality of connections set on a PPP session. As to the connections, there exist a main service connection and an auxiliary service connection. The main service connection is a connection which is always established between the MS and PDSN to communicate PPP control messages between the MS and PDSN. The auxiliary service connection is a connection to be established in addition to the main service connection according to application requests such as VoIP. A plurality of auxiliary service connections are set as required between the MS and PDSN.

FIG. 7 shows an example of call flow conceivable from a related art for assuring QoS before and after inter-PDSN handover.

Between the MS and PDSN, a main service connection is set first and a QoS setting for an auxiliary service connection is performed according to a request from an application that operates on the MS. Further, the MS 10 performs a procedure for setting a main service connection (main SC) 81 with the sPDSN 2. On completion of the main service connection procedure, the sPDSN 2 transmits an access request message 82 for authenticating the MS 10 to the AAA server 11, and waits for an access accept message 83 from AAA 11. To the access accept message 83, a QOS User Profile is added. In the QOS User Profile, a QoS level having been decided in a contract made with a carrier by an MS user, that is, the QoS (accepted QoS) usable to the MS 10 is stipulated.

Upon receiving the access accept message 83, sPDSN 2 notifies sRAN 4 (one or both of the sBS 7 and sPCF 6) of the QOS User Profile by an access admission message (All Session Update Message) 84. On the other hand, on completion of the main service connection procedure, MS 10 requests QoS of auxiliary service connection from sBS 7 by a QoS request message 85. In the QoS request message 85, the QoS (R QoS) requested by the MS 10 is specified.

Upon receiving the QoS request message, sRAN 4 executes a QoS authorization and admission control procedure 86. In the QoS authorization and admission control procedure 86, the R QoS and QOS User Profile are compared to determine whether the R QoS is QoS accepted by MS 10. When the R QoS is QoS accepted by the MS 10, and communication resources such as bandwidth exist sufficiently in wireless sections, a wireless resource satisfying R QoS is allocated to the MS 10. The accepted QoS denotes QoS assured of use to a relevant MS user in QOS User Profile. In descriptions hereinafter, QoS actually allocated to the MS in the QoS authorization and admission control procedure 86 is referred to as G QoS.

The sRAN 4 notifies the MS 10 of the G QoS assured in the procedure 86 by a service connect message 87. In response to the service connect message 87, MS 10 returns a service connect completion message 88 to sRAN 4. In the procedure 86, if the R QoS violates accepted QoS assured previously to MS 10, or wireless resources satisfying R QoS do not remain, sRAN 4 rejects the allocation of the R QoS. In this case, sRAN 4 transmits a reject message to MS 10 instead of the service connect message 87. When the reject message is issued, a sequence after the service connect message 87 shown in FIG. 7 is not executed.

Upon receiving the service connect completion message 88, sRAN 4 notifies sPDSN 2 of the G QoS and R QoS by an A11 registration request message 89. In response to the A11 registration request message 89, sPDSN 2 returns an A11 registration reply message 90 to sRAN 4. On the other hand, MS 10 sends to sPDSN 2 a Resv message 91 including information on the correspondence of the IP address of MS 10 with connection identifiers as TFT (Traffic Flow Template). In response to the Resv message 91, sPDSN 2 returns a confirmation message 92 to MS 10. Thereby, packet communication complying with the G QoS is started through the auxiliary service connection 93 between sPDSN 2 and MS 10.

Here, it is assumed that inter-PDSN handover occurs as the MS 10 moves after the communication through the auxiliary service connection 93 was started. In this case, after handover of the main service connection 81 is completed, handover of auxiliary service connection 93 and the reallocation of G QoS are performed. That is, connection 94 is set by a P-P interface between sPDSN 2 and tPDSN 3, and a new main service connection 95 is set between tPDSN 3 and MS 10. Next, QOS User Profile, G QQS, and R QoS are notified from sPDSN 2 to tPDSN 3 by a transfer message 96. After that, QoS setting is performed among MS 10, tRAN 5, and tPDSN 3 by message communication 98 in the wireless section. Further, a connection 105 is set by the P-P interface between sPDSN 2 and tPDSN 3, and an auxiliary service connection 106 is set between tPDSN 3 and MS 10.

Non-Patent Publication 1: The paper titled "Qualcomm, X31-20040607-018 R1, (Jul. 7, 2004)" of 3GPP2 (3rd Generation Partnership Project 2)

Non-Patent Publication 2: The paper titled "Nokia, X31-20040629-003, (Jul. 29, 2004)" of 3GPP2 (3rd Generation Partnership Project 2)

Non-Patent Publication 3: X.P0011-D-004, Rev0.5 (November, 2005) of which standardization is being made in 3GPP2 (3rd Generation Partnership Project 2)

Non-Patent Publication 4: X.P0011-D-003, Rev0.5 (November, 2005) (non-Patent Publication 4) of which standardization is being made in 3GPP2 (3rd Generation Partnership Project 2)

DISCLOSURE OF THE INVENTION

Problem to be Solved by the Invention

In order to seamlessly maintain an auxiliary service connection having severe latency requirements before and after handover, a fast handover is required. In inter-PDSN handover, therefore, the efficiency of the QoS information processing becomes a problem. A PDSN must manage QoS information (R QoS, G QoS, QOS User Profile) of all users connected to it. For example, if communications in the metropolitan area were covered by one PDSN, QoS information of an extremely large number of users would concentrate on one PDSN.

Accordingly, an object of this invention is to reduce the amount of QoS information to be handled in RAN devices and the PDSN in order to make QoS information processing efficient.

Another object of this invention is to make QoS information transfer between PDSNs in inter-PDSN handover efficient.

Further, another object of this invention is to make QoS information processing in a target RAN (tRAN) in inter-PDSN handover efficient.

Means for Solving the Problems

In order to achieve the above-described objects, a wireless communication system according to the invention comprises a plurality of wireless access networks each including a base station and a packet control apparatus, a plurality of node apparatuses each connecting one of the wireless access networks to an IP network, and an authentication server storing communication quality level information assured previously by contract for each of wireless mobile stations, each of the wireless access networks assuring the communication quality of packet flow between the node apparatus connected to the packet control apparatus and the wireless mobile station according to a communication quality request from the wireless mobile station in communication with the base station, wherein at least one of the base station and the packet control apparatus in each of the wireless access network includes means for verifying a first communication quality request received from the wireless mobile station based on communication quality level information acquired from the authentication server, converting the request into a second communication quality request (PAA QoS: Requested And Authorized QoS) including a communication quality parameter group in a range assured to the wireless mobile station, converting the second communication quality request into a third communication quality request (G QoS) acceptable to communication resources of the wireless access network, and controlling the communication quality of packet flow for the wireless mobile station according to the third communication quality request, and means for notifying the node apparatus connected to the packet control apparatus of at least one of the second and third communication quality requests, wherein each of the node apparatus includes means for storing communication quality requests notified from the wireless access network and notifying, when a wireless mobile station in communication moves to another wireless access network, another node apparatus to be a handover target of at least one of the second and third communication quality requests corresponding to the wireless mobile station, and means for notifying, when receiving a communication quality request of the wireless mobile station from another node apparatus, notifying the wireless access network connected to the node apparatus of the received communication quality request, and wherein at least one of the base station and the packet control apparatus of each of the wireless access network converts, when receiving the communication quality request from the node apparatus, the received communication quality request into a communication quality request acceptable to communication resources of the wireless access network, and controls the communication quality of packet flow for a wireless mobile station having moved into the wireless access network according to the communication quality request.

In the case where the first communication quality request includes plural sets of communication quality parameters with different request priorities, the second communication quality request includes communication quality parameter sets selected from the plural sets of communication quality parameters according to the assured communication quality level, the number of communication quality parameter sets is smaller than that of the first communication quality request, and the third communication quality request includes communication quality parameter sets, the number of which is equal to or less than that of the second communication quality request.

More specifically, the communication quality parameters of the third communication quality request are selected from the third communication request by using as the communication resource, for example, at least one of transmission rate, transmission latency, and error rate in a wireless access network, and the quality of a received signal or interference signal power in a wireless section.

Further, a wireless access network system of the invention comprises a base station and a packet control apparatus connected to a node apparatus through which the wireless access network system is connected to an IP network, wherein at least one of the base station and the packet control apparatus includes:

QoS authorization and admission control means for verifying a communication quality parameter group included in a first communication quality request received from a wireless mobile station connected to the base station based on communication quality level information which is assured previously to the wireless mobile station and acquired from an authentication server connected to the IP network, converting the first communication quality request into a second communication quality request including a communication quality parameter group in a range assured to the wireless mobile station, and converting the second communication quality request into a third communication quality request acceptable to communication resources of the wireless access network;

means for notifying the node apparatus connected to the packet control apparatus of at least one of the second and third communication quality requests;

QoS admission control means for converting, when a second communication quality request or a third communication quality request is received from another wireless access network or another node apparatus connected to the another wireless access network on account of handover of the wireless mobile station between node apparatuses, the received communication quality request into a communication quality request acceptable to communication resources of the wireless access network; and means for controlling the communication quality of packet flow for the wireless mobile station connected to the wireless base station, according to the third communication quality request created by the QoS authorization and admission control means, or the communication quality request created by the QoS admission control means.

One feature of the wireless access network system according to the invention resides in that the packet control apparatus comprises a memory unit for storing the second communication quality request converted by the QoS authorization and admission control means, and means for notifying, when handover between nodes apparatuses occurs on a wireless mobile station connected to the wireless base station, the packet control apparatus in the wireless access network to be a handover target of the second communication quality request.

According to this configuration, the wireless access network as a handover source can notify the wireless access network as a handover target of the second communication quality request, without passing through the node apparatus.

Further, in a method for assuring communication quality of packet flow according to the invention, at least one of the base station and the packet control apparatus in each wireless access network verifies a first communication quality request received from a wireless mobile station based on communication quality level information acquired from the authentication server, and converts the request into a second communication quality request including a communication quality parameter group in a range assured to the wireless mobile station, converts the second communication quality request into a third communication quality request acceptable to communication resources of the wireless access network, notifies the node apparatus connected to the packet control apparatus of at least one of the second and third communication quality requests, and controls the communication quality of packet flow for the wireless mobile station according to the third communication quality request;

each node apparatus connected to the wireless access network stores communication quality requests notified from the wireless access network, notifies when a wireless mobile station in communication moves to another wireless access network, a node apparatus to be a handover target of at least one of the second and third communication quality requests corresponding to the wireless mobile station, and notifies when receiving a communication quality request of the wireless mobile station from another node apparatus, the wireless access network connected to the node apparatus of the received communication quality request; and at least one of the base station and the packet control apparatus in each of the wireless access networks converts a communication quality request received from the node apparatus into a communication quality request acceptable to communication resources of the wireless access network, and controls the communication quality of packet flow for a wireless mobile station having moved into the wireless access network according to the communication quality request.

The first communication quality request includes, for example, plural sets of communication quality parameters with different request priorities. In this case, at least one of the base station and the packet control apparatus in each of the wireless access networks selects from the first communication quality request a communication quality parameter set to be assured from among the plural sets of communication quality parameters indicated by the first communication quality request, according to communication quality level information assured previously to the wireless mobile station, creates the second communication quality request including communication quality parameter sets, the number of which is smaller than that of the first communication quality request, and creates the third communication quality request from the second communication quality request, the third communication quality request including communication quality parameter sets, the number of which is equal to or smaller than that of the second communication quality request.

The first communication quality request may define request communication quality with a plurality of communication quality parameter sets each having a request priority different for each flow. In this case, at least one of the base station and the packet control apparatus in each of the wireless access networks creates the second communication quality request by selecting communication quality parameter sets to be assured for each flow from the first communication quality request, according to communication quality level information assured previously to the wireless mobile station, and creates the third communication quality request by selecting an acceptable communication quality parameter set from the second communication quality request according to available communication resources.

Effects of the Invention

Accordingly, when handover between node apparatuses occurs, the amount of control information to be transferred from a handover source to a handover target is reduced. Therefore, QoS control for a wireless mobile station in a wireless access network to be the handover target is facilitated, and communication resources can be effectively used.

BEST MODE FOR CARRYING OUT THE INVENTION

Although, in embodiments described below, both a base station BS and a packet control function node PCF have a processing function for QoS requests and a QoS control function, the processing function for QoS requests may be provided in only one of BS and PCF.

FIG. 2 shows one example of a base station BS 7 of the invention.

The BS 7 is a base station that serves as an access point of MS 10. A network interface (NW IF) 25 is an interface with a network for connecting to PCF 6. A baseband processing unit BB 24 performs baseband processing of transmission/reception signals, modulation of transmission signals, and synchronous acquisition and demodulation of receive signals. An intermediate frequency processing unit IF 23 performs signal processing in an intermediate frequency IF.

The IF 23 subjects a baseband signal inputted from the BB 24 to DA (Digital to Analog) conversion. After that, the IF 23 converts the digital signal into the intermediate frequency and outputs it to a wireless frequency processing unit RF 22. Further, the IF 23 subjects a signal inputted from RF 22 to AD (Analog to Digital) conversion and outputs it to the BB 24. The RF (radio frequency unit) 22 performs processing of radio frequency (RF) signals. The RF 22 up-converts a signal inputted from the IF 23 to a radio frequency, amplifies transmission power of the signal and outputs it to an antenna 21 for transmission to the MS 10. Further, the RF 22 down-converts a radio signal from the MS 10 inputted from the antenna 21 to an intermediate frequency and outputs it to the IF 23.

A controller 27 has a management function of the entire BS 7. Between the BS 7 and the PCF 6, information is transmitted by A8 packets and A9 packets. Each of the A8 packets and A9 packets comprises a header portion to store control information and a payload portion to store transmission information. Control information of RAN is transmitted by setting it in the payload portion of the A9 packet. Transmission/reception information of the MS 10 is transmitted by setting it in the payload portion of the A8 packet.

The controller 27 performs assembling, disassembling, and discarding of A8 and A9 packets communicated between a wireless transmission unit and the PCF 6, controlling of transmission timing of the wireless transmission unit by use of a timer 26, and management of information in a memory unit 28. Further, the controller 27 performs QoS information processing which includes conversion from R QoS to RAA (Requested And Authorized) QoS based on a QOS User Profile described later and conversion from RAA QoS to G QoS based on the states of communication resources, and performs QoS control of individual mobile terminals according to G QoS. The memory unit 28 stores transmission/reception data and management information including QoS information. The timer 26 is a counter increasing with time.

FIG. 3 shows an example of a packet control function node (PCF) 6 according to the invention.

The PCF 6 creates A8 packets or A9 packets to transmit them to the BS 7. The PCF 6 receives A8 packets or A9 packets from the BS 7. Information is transmitted by A10 packets and A11 packets between the PCF 6 and PDSN 2. Each of the A10 and A11 packets comprises a header portion to store control information and a payload portion to store transmission information. Control information of RAN is transmitted by setting it in the payload portion of the A11 packet. Transmission/reception information of the MS 10 is transmitted by setting it in the payload portion of the A10 packet.

The PCF 6 rewrites the headers of the A8 and A9 packets received from, for example, the BS 7, to convert them into the A10 and A11 packets, respectively. Further, the PCF 6 rewrites the headers of the A10 and A11 packets received from the PDSN 2 to convert them into the A8 and A9 packets, respectively. The PCF 6 creates the A10 packets or A11 packets to transmit them to the PDSN 2.

NW IF 30 is a network interface for connecting to PCF 8. NW IF 31 is a network interface for connecting to the BS 7. NW IF 36 is a network interface for connecting to PDSN 2. SW 32 and SW 35 are switches to exchange signals. A control unit 33 performs, in addition to management of the entire PCF 6, QoS information processing which includes conversion from R QoS to RAA QoS based on QOS User Profile, and conversion from RAA QoS to G QoS based on states of communication resource. TC 34 is a Traffic Controller for assembling, disassembling, and transmitting and receiving A8 packets and A10 packets.

FIG. 4 shows an example of the traffic control unit TC 34 of the invention.

A memory unit 37 stores transmission/reception packet data and management information including QoS information specified by the control unit 33 of PCF 6. CPU 38 performs management of information stored in the memory unit 37 and packet transmission/reception management such as assembling, disassembling, discarding of A9 and A11 packets, and flow control of packets in accordance with the QoS information. Timer 39 is a counter increasing with time.

FIG. 5 shows an example of a packet data serving node (PDSN) 2 of the invention.

The PDSN 2 receives IP packets from an IP network 1. PDSN 2 creates A10 packets or A11 packets for transmission to the PCF 6, and receives A10 or A11 packets from the PCF 6. The PDSN 2 creates IP packets for transmission to the IP network 1. NW IF 46 is a network interface with a network for connecting to the PCF 6. NW IF 47 is a network interface for connecting to the IP network 1. NW IF 48 is a network interface for connecting to other PDSNs.

A memory unit 42 stores IP packets to be transmitted or received, A10/A11 packets, and management information including QoS information. A control unit 43 performs the management of information stored in the memory unit 42, packet transmission/reception management such as assembling, disassembling, and discarding of A10/A11 packets, and QoS information processing. UIF 44 is a user interface, and timer 45 is a counter increasing with time.

FIG. 6 shows an example of AAA (Authentication, Authorization and Accounting) 11 which is a server according to the present invention.

Conventionally, RADIUS (Remote Authentication Dial In User Service) is known as an accounting and authentication protocol. RADIUS is standardized by IETF (Internet Engineering Task Force). RFC 2139 describes transmission protocol of accounting information between Network Access Server and an accounting server.

The AAA 11 performs processing for authentication and accounting according to RADIUS, for example. NW IF 51 is a network interface for connecting to the IP network 1. A memory unit 52 stores management information including User QoS Profile which will be described later. A control unit 53 performs the management of information stored in the memory unit 52, control of IP packet transmission/reception, and authentication and accounting. UIF 54 is a user interface. By using the UIF 54, a wireless network operator performs, for example, addition of User QoS Profile information to the memory unit 53 and edition of the User QoS Profile, based on a contract with a user. Timer 55 is a counter increasing with time. The AAA 11 measures accounting start time and accounting end time by the timer 55, and charges fees depending on the time.

Next, with reference to FIG. 8, a description is made of a first embodiment of a call flow of this invention that simplifies QoS information processing (G QoS allocation) in tRAN, by sending reduced QoS information of the MS 10 from sRAN to tRAN when handover between PDSNs occurs as the MS 10 moves.

As the control sequence until the MS 10 requests QoS (R QoS) of auxiliary service connection by a QoS request message 85 is the same as that in FIG. 7, detailed description of it is omitted here.

In QoS authorization and admission control procedure 140 in a state before the MS 10 moves into tRAN, sRAN 4 (sBS or sPCF) refers to QOS User Profile to select an acceptable QoS parameter group from among parameter groups indicated by QoS (R QOS) requested by the MS 10, and stores it in a memory as RAA QOS.

As detailed in FIG. 13, R QOS specifies request QoSes for one or a plurality of flows. The request QoS is defined with a plurality of QoS parameter sets for indicating request QoS of a plurality of levels for each flow. As detailed in FIGS. 15 and 16, QOS User Profile indicates threshold levels accepted by each MS user by contract, about at least part of QoS definition items (priority, transmission rate at peak, acceptable maximum latency, total bandwidth, etc.) included in R QOS.

In the QOS authorization and admission control procedure 140, the sRAN 4 compares QoS parameter sets specified in R QoS with the QOS User Profile, excludes QoS parameter sets not matching the QOS User Profile, and converts R QoS into RAA QoS (Requested And Authorized QoS) including a QoS parameter set group matched with the QOS User Profile. The sRAN 4 verifies the QoS parameter set group indicated by the RAA QoS, based on states of current wireless and wired communication resources, selects a QoS parameter set assurable in sRAN 4, and allocates Qos to the MS 10. Hereinafter, QoS actually allocated to the MS 10 by sRAN 4 or tRAN, that is QoS defined in a QoS parameter set assured to the MS by sRAN 4 or tRAN will be referred to as G QoS.

The sRAN 4 notifies the MS 10 of G Qos by a service connect message 87. In response to the service connect message 87, the MS 10 returns a service connect completion message 88 to the sRAN 4. The sRAN 4 notifies sPDSN 2 of QoS information (G QoS and RAA QoS in this embodiment) by an A11 registration request message 141.

For example, of sBS 7 and sPCF 6 that constitute sRAN 4, if the sBS7 executes the QoS authorization and admission control procedure 140 and stores RAA QoS in the memory unit 28, the controller 27 of the sBS 7 reads out RAA QoS from the memory unit 28 to generate a QoS information notification message including RAA QoS and G QoS, and transmits it to sPCF 6 from NW IF 25. The QoS information notification message is received by the NW IF 31 of sPCF 6, and analyzed by the control unit 33 which generates an A11 registration request message 141 including G QoS and RAA QoS.

The control unit 33 of the sPCF 6 transmits the A11 registration request message 141 to the sPDSN 2 from the NW IF 36. The A11 registration request message 141 is received by the NW IF 46 of sPDSN 2, and analyzed by the control unit 43. The control unit 43 of the sPDSN 2 stores G QoS and RAA QoS included in the A11 registration request message 141 in the memory unit 42, and sends an A11 registration reply message 90 to the sRAN 4.

The MS 10 sends a Resv message 91 indicating the correspondence between the IP address of the MS 10 and connection identifier to the sPDSN 2. In response to the Resv message 91, the sPDSN 2 returns an acknowledgment message 92 to the MS 10. Thereby, the setting of the auxiliary service connection 93 between the sPDSN 2 and MS 10 is completed, and the MS 10 can perform communications with assured QoS (G QoS) through the auxiliary service connection 93.

It is assumed that inter-PDSN handover occurs due to movement of the MS 10 after starting communication through the auxiliary service connection 93. The occurrence of handover, for example, can be detected by tRAN and notified to sPDSN via tPDSN. sPDSN 2 transmits to tPDSN 3 a transfer message 142 including QOS User Profile, G QoS, and RAA QoS. In this case, the control unit 43 of sPDSN 2, for example, reads out QOS User Profile, G QoS, and RAA QoS stored in the memory unit 42, and generates a transfer message 142. The message 142 is transmitted to tPDSN 3 from NW IF 48.

tPDSN 3 forwards the QOS User Profile, G QoS, and RAA QoS to tRAN 5 by an access accept message 143. The control unit 43 of tPDSN 3 analyzes the transfer message 142 received by NW IF 48, and stores the QOS User Profile, G QoS, and RAA QoS included in the transfer message 142 in the memory unit 42. The control unit 43 of tPDSN 3 generates an access accept message 143 including the QOS User Profile, G QoS, and RAA QoS, and transmits the access accept message 143 to tPCF 8 from NW IF 46.

The control unit 33 of tPCF 8 analyzes the transfer message 143 received by NW IF 36, and stores the QOS User Profile, G QoS, and RAA QoS included in the message 143 in the memory unit 37. The control unit 33 of tPCF 8 generates a QoS information notification message including the QOS User Profile, G QoS, and RAA QoS, and transmits it to tBS 9 from NW IF 31. The controller 27 of tBS 9 analyzes the QoS information notification message received by NW IF 7, and stores the QOS User Profile, G QoS, and RAA QoS included in the QoS information notification message in the memory unit 28.

In a QoS admission control procedure 144, tRAN 5 verifies the QoS parameter set group indicated in RAA QoS which was notified by a transfer message 143 from tPDSN 3, based on a state of current communication resources, selects an assurable QoS parameter set, and allocates QoS defined in the assured QoS parameter set to MS 10 as G QoS. That is, tRAN 5 allocates G QoS when communication resources of tRAN 5 has a margin to accommodate a new connection in any of QoS of a plurality of levels requested by RAA QoS. If tRAN 5 has no available communication resources to satisfy any of levels included in RAA QoS, G QoS in RAA QoS is not allocated, and tRAN5 sends a request refusal message to MS 10.

Since acceptance is already made in tRAN 4 that executed QoS authorization and admission control procedure 140, tRAN 5 can omit, in the Qos admission control procedure 144, comparison processing between RAA QoS and the QOS User Profile for confirming that RAA QoS is QoS accepted by MS 10. tRAN 5 sends to tPDSN 3 an A11 registration request message 145 including RAA QoS and G QoS allocated to MS 10. In response to the A11 registration request message 145, tPDSN 3 returns an A11 registration reply message 100 to tRAN 5.

tRAN 5 sends QoS (G QoS), which was assured in the QoS admission control procedure 144, by service connect message 101 to MS 10. In response to the service connect message 101, MS 10 returns a service connect completion message 102 to tRAN 5. After that, like before the handover, QoS setting is performed among MS 10, tRAN 5, and tPDSN 3, and an auxiliary service connection 106 is set from sPDSN 2 till MS 10 via tPDSN 3.

According to the embodiment, as described above, processing using the QOS User Profile becomes unnecessary in the QoS admission control procedure 144. Therefore, of QoS User Profile, G QoS, and RAA QoS shown in the embodiment, the message 142 to be transmitted from sPDSN 2 to tPDSN 3 may transfer only any one or two parameters including RAA QoS, and other parameters may be omitted.

In the embodiment, sRAN 4 selects a QoS parameter set group acceptable to MS users as RAA QoS, from among a QoS parameter set group included in R QoS, based on the QoS User Profile, and stores it in sPDSN 2. In this case, since sPDSN can exclude unnecessary QoS parameter information unacceptable to the users from storage targets, the storage capacity of memory can be saved.

In the embodiment, also in tRAN 5 (tBS 9 or tPCF 8) that executes the QoS admission control procedure 144, RAA QoS information received from tPDSN 3 must be stored. However, since QoS parameters unnecessary for the allocation of G QoS to MS 10 has been already excluded from RAA QoS that tRANS 5 has received from tPDSN 3, the storage capacity of memory can be saved. In the QoS admission control procedure 144, the allocation of G QoS to MS 10 can be executed based on RAA QoS including QoS parameter information already authenticated in sRAN side. Accordingly, QoS allocation can be completed in a short time by omitting QoS authentication processing based on QoS User Profile.

Furthermore, according to the embodiment, the payload of the transmission message 141 from sRAN to sPSDN includes RAA QoS instead of R QoS. Likewise, also in the payload of the transmission message 142 from sPSDN to tPSDN, and in the payload of the transmission message 143 from tPSDN to tRAN, RAA QoS is set. Accordingly, these messages can be made shorter in payload length than R QoS transmission messages, and communication resources in a wired network can be saved.

FIG. 9 shows a communication sequence of a call flow according to the second embodiment of the invention to be executed when inter-PDSN handover occurs. This embodiment is characterized in that sPDSN reduces QoS information, so that processing of QoS information in tRAN (allocation of G QoS) is simplified by notifying tRAN of the reduced QoS information via PDSN.

sRAN 4 notifies sPDSN 2 of QoS (G QoS) allocated to MS 10 and requested QoS (R QoS) by an A11 registration request message 89. In response to the A11 registration request message 89, sPDSN 2 returns an A11 registration reply message to sRAN 4. The sequence until sPDSN 2 sends the A11 registration reply message 90 is the same as that in FIG. 7.

In the embodiment, SPDSN 2 refers to QOS User Profile in a selection step 146 of parameter information of RAA QoS, converts R QoS into RAA QoS, and stores it in the memory unit. A sequence after the RAA QoS parameter information selection 146 is the same as that in FIG. 8. In the QoS admission control procedure 144, tRAN 5 (tBS 9 or tPCF 8) verifies a QoS parameter set group indicated in RAA QoS which was notified from tPDSN 3 by the transfer message 143, based on a state of current wireless and wired communication resources, selects an assurable QoS parameter set, and allocates G QoS to MS 10.

According to the embodiment, like the first embodiment, since sPDSN may store RAA QoS, excluding unnecessary QoS parameter information unacceptable to users from storage targets, the storage capacity of memory can be saved. Further, in tRAN 5 (tBS 9 or tPCF 8) side that executes the QQS admission control procedure 144, the storage capacity of memory can be saved because QoS parameters unnecessary for the allocation of G QoS to MS 10 are already excluded from RAA QoS that tRAN 5 has received from tPDSN 3.

In the QoS admission control procedure 144, QoS allocation can be completed in a short time by omitting QoS authentication processing based on QoS User Profile. Further, when sRAN 4 notifies sPDSN of the QoS information of MS 10 having moved, communication resources within a wired network can be saved because the payload length of a transmission message 142 from sPSDN to tPSDN and a transmission message 143 from tPSDN to tRAN can be shortened.

In the above-described embodiments of FIGS. 8 and 9, tRAN 5 to which MS 10 has moved receives RAA QoS from tPDSN 3. However, RAA QoS may be notified directly from sRAN 4 to tRAN 5.

FIG. 10 shows a communication sequence of a call flow according to a third embodiment of the invention to be executed when inter-PDSN handover occurs. This embodiment is applied when a communication interface exists between PCFs, and a control message 70 can be transmitted and received between RANs via the communication interface. The sequence until a main service connection 95 is established via tPDSN 3 is the same as that in FIG. 8.

This embodiment is characterized in that sRAN 4 directly notifies tRAN 5 of RAA QoS by an inter-RAM transfer message 70 when inter-PDSN handover occurs.

For example, it is assume that sBS 7 executes the QoS authorization and admission control procedure 140 in sRAN 4 side, and RAA QoS is stored in the memory unit 28 of sBS 7. In this case, the controller 27 of sBS 7 reads out RAA QoS from the memory unit 28, creates an RAA QoS notification message, and transmits it to sPCF 6 from NW IF 25.

The RAA QoS notification message is received by NW IF 31 of sPCF 6, and the control unit 33 analyzes the received message to generate an inter-RAN control message 70 including RAA QoS. The control unit 33 of sPCF 6 transmits the control message 70 to tPCF 8 from NW IF 30.

Upon receiving the control message 70 through NW IF 30, the control unit 33 of tPCF 8 extracts RAA QoS from the received message 70, creates an RAA QoS notification message, and transmits it to tBS 9 from NW IF 31. The controller 27 of tBS 9 analyzes the received RAA QoS notification message, and stores RAA QoS indicated by the received message in the memory unit 28. The sequence after the admission control 144 is the same as that in FIG. 8.

In the QoS admission control procedure 144, tBS 9 verifies a QoS parameter set group indicated in RAA QoS having been notified with the RAA QoS notification message from tPCF 8, based on a state of current communication resources, selects an assurable QoS parameter set, and allocates G QoS to MS 10.

According to this embodiment, like the first embodiment, since sPDSN may store RAA QoS, excluding unnecessary QoS parameter information unacceptable to users from storage targets, the storage capacity of memory can be saved. Further, in tBS 9 that executes the QQS admission control procedure 144, since QoS parameters unnecessary for the allocation of G QoS to MS 10 has been already excluded from the received RAA QoS, the storage capacity of memory can be saved. By omitting QoS authentication processing based on QoS User Profile in the QoS admission control procedure 144, QoS allocation can be completed in a short time.

FIG. 11 shows a communication sequence of a call flow according to a fourth embodiment of the invention to be executed when inter-PDSN handover occurs. The sequence until the main service connection 95 is established via tPDSN 3 is the same as that in FIG. 8.

It is assumed that inter-PSDN handover occurs in MS 10 after communication start in the auxiliary service connection 93. In this embodiment, sPDSN 2 notifies tPDSN 3 of RAA QoS a transfer message 148, and tPDSN 3 notifies tRAN 5 of the RAA QoS by an access accept message 149.

Since the RAA QoS is assured that is was already accepted by applying QOS User Profile in the QoS authorization and admission control procedure 140 having been executed in sRAN, tRAN does not need to send QOS User Profile for accepting request QoS of MS 10 from sPDSN 2 to tPDSN 3. In the QoS admission control 144 to be executed in tRAN 5, comparison processing between RAA QoS and QOS User Profile for confirming that the RAA QoS is QoS accepted by MS 10 may be omitted.

In the QoS admission control procedure 144, tRAN 5 (tBS 9 or tPCF 8) verifies a QoS parameter set group indicated in RAA QoS which was notified from tPDSN 3 by the transfer message 143, based on a state of current wireless and wired communication resources, selects an assurable QoS parameter set, and allocates G QoS to MS 10.

According to this embodiment, like the first embodiment, since sPDSN may store RAA QoS, excluding unnecessary QoS parameter information unacceptable to users from storage targets, the storage capacity of memory can be saved. Further, in tRAN 5 (tBS 9 or tPCF 8) side that executes the QoS admission control procedure 144, since QoS parameters unnecessary for the allocation of G QoS to MS 10 has been already excluded from RAA QoS received from tPDSN 3, the storage capacity of memory can be saved. By omitting QoS authentication processing based on QoS User Profile in the QoS admission control procedure 144, QoS allocation can be completed in a short time. Further, since the payload length of the messages 141, 148, and 149 for notifying QoS information of MS 10 can be shortened, communication resources within a wired network can be saved.

FIG. 12 shows a communication sequence of a call flow according to a fifth embodiment of the invention to be executed when inter-PDSN handover occurs. The sequence until a main service connection 95 is established via tPDSN 3 when inter-PDSN handover of MS 10 occurs after starting communication through the auxiliary service connection 93 is the same as that in FIG. 8. In this embodiment, sRAN notifies sPDSN 2 of G QoS by the A11 registration request message 141 in the process of establishing the auxiliary service connection 93.

In this embodiment, sPDSN 2 notifies tPDSN 3 of G QoS by a transfer message 150, and tPDSN 3 notifies tRAN 5 of the G QoS by an access accept message 151.

Since the G QoS was assured that it was already accepted in the QoS authorization and admission control procedure 86 having been executed in sRAN, sPDSN 2 and tPDSN 3 do not need to transmit QOS User Profile to tRAN 5. In the QoS admission control procedure 152, tRAN5 does not need to determine whether the content of G QoS is acceptable to MS 10.

In the QoS admission control procedure 152, tRAN 5 (tBS 9 or tPCF 8) verifies a parameter set group of G QoS notified from tPDSN 3 by the access accept message 151, based on a state of current wireless and wired communication resources, and selects an assurable QoS parameter set to allocate the G QoS to MS 10.

In this embodiment, since sPDSN 2 may store G QoS with reduced information amounts, memory capacity can be saved. Since tRAN 5 (tBS 9 or tPCF 8) may also store the G QoS, and does not need to store unnecessary QoS parameter information unacceptable to users, memory capacity can be saved. By omitting QoS authentication processing based on QoS User Profile, QoS allocation can be completed in a short time in the QoS admission control procedure 152. Furthermore, since the payload length of the messages 89, 150, and 151 for notifying QoS information of MS 10 can be shortened, communication resources within a wired network can be saved.

In the embodiments shown in FIGS. 11 and 12, since QoS information notification message 148 or 150 from sPDSN 2 to tPDSN 3 includes only RAA QoS or G QoS with reduced information amounts, transfer information amounts and processing amounts in the system can be reduced, so that fast handover can be realized.

Even when sPDSN 2 sends RAA QoS or G QoS to tPDSN 3, sPDSN may send QOS User Profile to tPDSN by a message different from the transfer messages 148 and 150. According to this way, when MS 10 requests new QoS flow setting after handover, tPDSN can immediately supply the QOS User Profile of MS 10 to tRAN.

FIG. 13 shows an example of the format of R QoS included in the QoS requirement message 85. A user ID (User ID) 159 indicates a user identifier of MS 10. The number of flows (Num Flow) 160 indicates the number of flows (auxiliary service connections) n that MS 10 requests QoS. Num Flow 160 is followed by n flow entries as R QoS (Flow ID=1) 161 to R QoS (Flow ID=n) 163 for indicating a request QoS of each flow. Here, the flow entry of R QoS (Flow ID=1) comprises an information block 158 that defines the content of QoS requested by MS 10 for a flow having flow ID=1. Each of the other entries also comprises similar information block.

The information block 158 includes: Flow ID 164 indicating the identifier of a flow to which QoS definition of the information block 158 is applied; a plurality of QoS parameter entries (R QoS parameter set) 167-169; a set number (Num Set) 166 indicating the number m of QoS parameter entries included in the information block 158; and length (Length) 165. The Length 165 indicates the length of Num Set 166 and QoS parameter entries 167-169 that follow it. Each of these parameter entries 167-169 has a set ID (Set ID) and arrayed in a request priority order.

As shown in an information block 157, for example, each QoS parameter entry specifies: Set Length 170 indicating the length of the QoS parameter entry; an ID (Set ID) 157 being the identifier of the QoS parameter entry; a traffic class 172 indicating a traffic type such as conversation and streaming; a priority 173 indicating the allocation priority of wireless resources; a peak rate 174 indicating a transmission rate during peak; a maximum latency (Max latency) 175 indicating maximum latency value acceptable to a flow; a maximum loss rate 176 indicating the maximum value of a data loss rate acceptable to a flow; and a maximum jitter (max jitter) 177 indicating the maximum value of jitter acceptable to a flow.

FIG. 14 shows an example of the format of G QoS.

G QoS comprises: a user ID 179 indicating the user identifier of requesting source MS 10; Num Flow 180 indicating the number n of following flow entries; and n flow entries 181-183. As shown by a block 178, each flow entry includes a Flow ID 184 indicating a flow identifier, and a set ID (Set ID) 185 identifying a QoS parameter set. By the values of Flow ID 184 and set ID (Set ID) 185, MS 10 can determine which of QoS parameter sets (parameter entries) 167 to 169 was allocated in each flow specified by R QoS described in FIG. 13.

FIG. 15 shows an example of the format of QOS User Profile.

QOS User Profile includes: User ID 191 indicating the identifier of MS user; Authorized Set ID 192 indicating a list of Set IDs accepted by the user by a contract; Authorized Priority 193 indicating priority accepted by the user; and Authorized Aggregate BW 194 indicating the total value of communication bandwidths (transmission rates) accepted by the user.

FIG. 16 shows another example of the format of QOS User Profile.

QOS User Profile shown here includes: User ID 200 indicating the user identifier of MS 10; Authorized Set ID 201 indicating a list of Set IDs accepted by the user by a contract; Authorized Traffic class 202 indicating traffic class accepted by the user; Authorized Priority 203 indicating priority accepted by the user; Authorized Peak rate 204 indicating Peak rate accepted by the user; Authorized Max latency 205 indicating max latency accepted by the user; Authorized Max loss rate 206 indicating max loss rate accepted by the user; Authorized Max jitter 207 indicating max jitter accepted by the user; and Authorized Aggregate BW 194.

FIG. 17 shows an example of entry of a QoS information table (PDSN table) held in the memory unit 42 by PDSNs 2 and 3.

In the PDSN table, a plurality of entries are registered, each entry indicating User QoS Profile 211, RAA QoS 212, and G QoS 213, in association with User ID 210 indicating the identifier of MS user.

User QoS Profile 211 has contents of QoS User Profile shown in FIG. 15 or 16, but User ID 200 is excluded. RAA QoS 212 has an amount of R QoS information reduced by RAA QoS parameter information selection processing based on User QoS Profile. The selection processing of RAA QoS parameter set based on User QoS Profile will be detailed later with reference to FIGS. 20 and 21. G QoS 213 is QoS actually allocated to MS user by RAN. G QoS 213 has contents of G QoS shown in FIG. 14, but User ID 179 is excluded.

FIG. 18 shows an example of entry of a QoS information table (BS/PCF table) held in the memory unit 28 of BS, or the memory unit 37 of PCF.

Like the PDSN table shown in FIG. 17, the BS/PCF table also indicates User QoS Profile 216, RAA QoS 217, and G QoS 218 of MS user, in association with User ID 215. The content of User QoS Profile 216 is the same as the content of User QoS Profile 211 of FIG. 17.

FIG. 19 shows an example of entry of a QoS information table (AAA table) held in the memory unit 52 by AAA 11. In the AAA table, a plurality of entries are registered. Each entry indicates User QoS Profile 221 in association with User ID 220 indicating the identifier of MS user. The content of User QoS Profile 221 is the same as the content of User QoS Profile 211 of FIG. 17.

FIG. 22 shows an example of the format of RAA QoS.

RAA QoS has contents of R QoS shown in FIG. 13, but QoS parameter sets (parameter entries) not matching User QoS Profile are excluded by selection processing of RAA QoS parameter set based on User QoS Profile.

Like R QoS, RAA QoS comprises: User ID 259; a flow number (Num Flow) 260; a plurality of flow entries indicating QoS for each flow; and RAA QoS (Flow ID=1) 261 to RAA QoS (Flow ID=n) 263. Each flow entry comprises an information block 258 defining the content of QoS, as shown in association with the entry of RAA QoS (Flow ID=1), for example.

Like the information block 158 of R QoS, the information block 258 includes: a flow ID 264 indicating the identifier of a flow to which QoS definition of the information block 258 is applied; a plurality of QoS parameter entries (RAA QoS parameter set) 267-269; a set number (Num Set) 266 indicating the number h of QoS parameter entries included in the information block 258; and length (Length) 265. These entries 267-269 are arranged in the order of set IDs (Set ID) indicating a request order. The number h of QoS parameter entries (RAA QoS parameter set) included in each flow entry of RAA QoS is equal to or less than the number m of QoS parameter entries (R QoS parameter set) included in each flow entry of R QoS. This is for the purpose of deleting QoS parameter sets not matching QoS User Profile from a parameter set group of R QoS by applying the QoS User Profile, in the RAA QoS parameter information selection processing.

Like R QoS, each QoS parameter entry designates, for example, as shown in an information block 257: Set Length 270 indicating the length of an entry; a set ID (Set ID) 257 to be the identifier of the entry; Traffic class 272 indicating a traffic class; Priority 273 indicating allocation priority of wireless resources; Peak rate 274 indicating a transmission rate during peak; Max latency 275 indicating the maximum latency value acceptable to a flow; Max loss rate 276 indicating the maximum value of a data loss rate acceptable to a flow; and a Max jitter 277 indicating the maximum value of jitter acceptable to a flow.

FIG. 20 is a flowchart showing an embodiment of RAA QoS parameter selection (QoS acceptance) processing to be executed in the QoS authorization and admission control procedure 140 or 86 by BS 7, PCF 6 or PDSN 2 which acts as a handover source.

In the RAA QoS parameter selection processing of this embodiment, by applying the QoS User Profile shown in FIG. 15, QoS parameter sets not matching QoS User Profile are deleted from an R QoS parameter set group of FIG. 13 requested by MS 10. Thereby, R QoS is converted into RAA QoS with only QoS parameter sets accepted by QoS User Profile left.

This embodiment assumes that the memory unit 28 of BS (or the memory unit 37 of PCF, or the memory unit 42 of PDSN) holds QOS User Profile. In this case, the controller 27 of BS (or the control unit 33 of PCF and the control unit 49 of PDSN) compares all QoS parameter sets with QOS User Profile for each of R QoS flow entries in accordance with a procedure described below, and selects a QoS parameter set (RAA QoS parameter set) matching QOS User Profile from R QoS.

The controller 27 detects, in Step 0, User ID 159 of R QoS, the number n of all flows indicated by Num Flow 160, and the number m of QoS parameter entries indicated by Num Set 166 corresponding to each flow. The controller 27 writes the values of User ID 259 and Num Flow 260 of RAA QoS shown in FIG. 22 to a storage area of RAA QoS 217 (or RAA QoS 212) allocated in the QoS table (BS/PCF table of FIG. 18) of the memory unit 28.

The controller 27 sets, in Step 1, the value of index J for specifying a flow entry to "1", and writes the values of Flow ID 264, Length 265, and Num Set ID 267 into the j-th ("first" now) RAA QoS entry of RAA QoS 217 (or RAA QoS 212). In Step 2, the controller 27 sets the value of index I for identifying a parameter entry to "1".

The controller 27 determines, in Step 3, whether the value of Set ID 171 of an information block 157 corresponding to Flow ID=J and Set ID=I of R QoS is within a range specified in Authorized Set ID 192 of QOS User Profile. If within a specified range, the controller 27 proceeds the program sequence to Step 4. Otherwise, the controller 27 discards R QoS information corresponding to Flow ID=J and Set ID=I in Step 8. Although QoS information is not written to RAA QoS 217 (or RAA QoS 212) of QoS table, in Step 8, the value of Num Set 266 is decremented (−1), and the value of Length 265 is rewritten to a value obtained by subtracting Set Length 170 from a current value.

For example, if the value of Set ID 171 of the information block 157 is "3", and Authorized Set ID 192 of QOS User Profile designates the values "1, 2, 3, 4, 5, 6, 7, 8", the program sequence proceeds to Step 4 because Set ID 171 is within a range specified in Authorized Set ID 192.

The controller 27 determines, in Step 4, whether the value of Priority 173 of the information block 157 is within a range specified in Authorized Priority 193 of QOS User Profile. If within the specified range, the program sequence proceeds to Step 5 to write the content of information block 157 corresponding to Flow D=J and Set ID=I to RAA QoS 217 (or RAA QoS 212) of QoS table. If the value of Priority 173 is not within the specified range, the controller 27 executes Step 8. For example, in the case where Priority has ranks of 0 to 15 in ascending order of priority, if Priority 173 is "10" and Authorized Priority 193 specifies "0 to 8", the controller 27 executes Step 8, as a result of determining that request Priority 173 is outside an acceptable range.

After executing Step 5 or Step 8, the controller 27 increments (+1) the value of index I for parameter entry in Step 6, and compares the value of I with R QoS entry number m in Step 7. If the value of I is equal to or less than m, the controller 27 returns to Step 3, and repeats the above-described processing on the next parameter entry in the j-th flow entry of R QoS selected as a determination target.

When the value of I exceeds m in Step 7, the controller 27 increments (+1) the value of index J for flow entry in Step 9, and compares the value of J with the number n of R QoS flow entries in Step 10. If the value of J is equal to or less than n, the program sequence returns to Step 2, whereby the above-described processing is repeated from the first parameter entry by changing the flow entry to be a determination target. When the value of parameter J exceeds n in Step 10, the RAA QoS parameter selection processing is completed.

FIG. 21 is a flowchart showing another embodiment of RAA QoS parameter selection (QoS acceptance) processing to be executed in BS 7, PCF 6 or PDSN 2 which acts as a handover source.

In this embodiment, R QoS of FIG. 13 requested by MS 10 is converted into RAA QOS by applying QoS User Profile shown in FIG. 16.

This embodiment also assumes that the memory unit 28 of BS (or the memory unit 37 of PCF, or the memory unit 42 of PDSN) holds QOS User Profile. In this case, the controller 27 of BS (or the control unit 33 of PCF or the control unit 43 of PDSN) compares, for each of flow entries of R QoS, all QoS parameter sets with QOS User Profile to select an RAA QoS parameter set matching QOS User Profile from R QoS, in accordance with a procedure described below.

Since the contents of processing in Steps 11-13 are the same as those of Steps 0-2 of FIG. 20, description of them is omitted here. The controller 27 determines, in Step 14, whether the value of Set ID 171 of an information block 157 corresponding to Flow ID=J and Set ID=I of R QoS is within a range specified in Authorized Set ID 201 of QOS User Profile. If within the specified range, the controller 27 proceeds the program sequence to Step 15. Otherwise, the controller 27 discards, in Step 22, QoS information corresponding to Flow ID=J and Set ID=I, decrements (−1) the value of QoS table Num Set 266, and rewrites the value of Length 265 to a value obtained by subtracting Set Length 170 from its current value.

In Step 15, the controller 27 determines whether the value of Traffic class 172 of the information block 157 is within a range specified in Authorized Traffic class 202 of the QOS User Profile. If within the specified range, the controller 27 proceeds the program sequence to Step 16; otherwise, executes Step 22. For example, in the case where Traffic class 172 of R QoS specifies Interactive class, and Authorized Traffic class 202 of QOS User Profile specifies Background class and Streaming class, the controller 27 determines that Traffic class 172 is outside the specified range, and executes Step 22.

In Step 16, the controller 27 determines whether the value of Priority 173 of the information block 157 is within a range specified in Authorized Priority 203 of QOS User Profile. If within the specified range, the controller 27 proceeds the program sequence to Step 17; otherwise executes Step 22.

In Step 17, the controller 27 determines whether the value of Peak rate 174 of the information block 157 is within a range specified in Authorized Peak rate 204 of QOS User Profile. If within the specified range, the controller 27 proceeds the program sequence to Step 18; otherwise, executes Step 22.

In Step 18, the controller 27 determines whether the value of Max latency 175 of the information block 157 is within a range specified in Authorized Max latency 205 of QOS User Profile. If within the specified range, the controller proceeds the program sequence to Step 19; otherwise executes Step 22. For example, in the case where Max latency 175 of R QoS is 20 ms and Authorized Max latency 205 is equal to or greater than 10 ms, Step 19 is executed because Max latency 175 is within the specified range.

In Step 19, the controller 27 determines whether the value of Max loss rate 176 of information block 157 corresponding to Flow ID=J and Set ID=I of R QoS is within a range specified with Authorized Max loss rate 206 of QOS User Profile. If within the specified range, the controller 27 proceeds the program sequence to Step 20; otherwise, executes Step 22. For example, in the case where Max loss rate 176 specifies "10-6", and authorized Max loss rate 206 specifies "10-4", Step 20 is executed because Max loss rate 176 is within the specified range.

In Step 20, the controller 27 determines whether the value of Max jitter 177 of the information block 157 is within a range specified in Authorized Max jitter 207 of QOS User Profile. If within the specified range, the controller 27 proceeds the program sequence to Step 21; otherwise, executes Step 22. For example, in the case where the value of Max jitter 177 is 2 ms and Authorized Max jitter 207 specifies 5 ms or less, Step 21 is executed because Max jitter 177 is within the specified range.

In Step 21, the controller 27 writes the content of the information block 157 corresponding to Flow ID=J and Set ID=I to RAA QoS 217 (or RAA QoS 212) of QoS table.

After executing Step 21 or Step 22, the controller 27 executes Steps 23-26. Since these Steps are the same as Steps 7-10 of FIG. 20, description of them is omitted.

FIG. 23 is a flowchart showing one embodiment of RAA QoS check processing to be executed in the QoS admission control procedure 144 by tRAN.

The tRAN that executes the RAA QoS check processing is at least one of tBS and tPCF. Either of tBS and tPCF may execute the check processing depending on system configuration. Here, description will be made on the case where tBS (or tPCF) executes the RAA QoS check processing (admission control procedure 144). Also in the QoS authorization and admission control procedure 140 and 86, G QoS is allocated to MS through the RAA QoS check processing similar to this.

It is assumed here that tBS stores in the QoS table shown in FIG. 18 formed in the memory unit 28, before executing the RAA QoS check processing, User ID 215, User QoS Profile 216, and RAA QoS 217 having a format shown in FIG. 22. At this time, G QoS 218 of the QoS table is empty. The controller 27 of BS checks the RAA QoS parameter set for each of the flow entries of RAA QoS, in accordance with a procedure described below.

The controller 27 extracts from RAA QoS, in Step 30, the number n of all flows indicated by Num Flow 260 of RAA QoS having User ID 259, and the number h of QoS parameter entries indicated by Num Set 266 corresponding to each flow, and writes the values of User ID 179 and Num Flow 180 into an area for G QoS 218 in the QoS table. The controller 27 sets the value of index J for identifying a flow entry to "1" in Step 31, and sets the value of index I for identifying a parameter entry to "1" in Step 32.

In Step 33, the controller 27 determines whether Peak rate 274 indicated by an information block corresponding to Flow ID=J and Set ID=I of RAA QoS can be assured (serviced) by tRAN. In this case, the controller 27 determines whether Peak rate 274 can be sufficiently assured, for example, on the basis of status information of wireless sections obtained as control information. As the status information of wireless sections, if QoS in communication channels between tBS and MS, such as the quality of received signals, interference signal power, communication data rate, and error rate each of which is measured in tBS (or MS) can be reflected, anything is usable. For example, a peak rate achievable in the wireless section may be held previously in the memory unit 28 of BS so as to determine whether Peak rate 274 is assurable, by referring to it. If Peak rate 274 requested by RAA QoS is assurable, the controller 27 proceeds the program sequence to Step 34, and if not assurable, executes Step 37.

In Step 34, the controller 27 determines whether Max latency 275 indicated by the information block 257 can be assured (serviced) in tRAN. For example, the controller 27 determines whether necessary Max latency 275 can be sufficiently assured by referring to the capacity of a transmission/reception buffer formed in the memory unit 28. Alternatively, an assurable maximum latency may be held previously in the memory unit 28 so as to determine whether Max latency 275 can be achieved by referring to it. If Max latency 275 is assurable, the controller 27 proceeds the program sequence to Step 35, and otherwise executes Step 37.

In Step 35, the controller 27 determines whether Max loss rate 276 of the information block 257 can be assured (serviced) in tRAN. This check is performed, for example, by referring to status information in the wireless section obtained as control information. A maximum loss rate may be held previously in the memory unit 28 so as to determine whether Max loss rate 276 can be assured by referring to it. If Max loss rate 276 is assurable, the controller 27 proceeds the program sequence to Step 36, and otherwise, executes Step 37.

In Step 36, the controller 27 accepts, for a flow of Flow ID=J, an RAA QoS parameter set corresponding to Set ID=I. In this case, the controller 27 writes the value of index J for flow entry and the value of index I for parameter entry as Flow ID 184 and Set ID 185 of G QoS (Flow ID=J), respectively.

After that, the controller 27 increments, in Step 40, the value of index J for flow entry, and compares, in Step 41, the value of index J with the number n of flows. If J is equal to or less than n, the controller 27 returns to Step 32, and sets the value of index I of parameter entries to the initial value "1" to repeat the above-described check for the first information block 257 of a flow entry having new Flow ID=J. when J exceeds n in Step 41, the controller 27 terminates the RAA QoS check processing.

If assurance has become impossible in any of Peak rate, Max latency, and Max loss rate in the information block 257 corresponding to Set ID=I, the controller 27 increments (+1), in Step 37, the value of index I for parameter entry, and compares, in Step 38, the value of I with the number h of parameter entries If the value of index I is equal to or less than h, the controller 27 returns to Step 33 to repeat the above-described check for a next parameter entry of the same flow entry.

If the value of index I exceeds h in Step 38, this means that no acceptable parameter set exists in a flow of Flow ID=J of RAA QoS. In this case, the controller 27 rejects, in Step 39, RAA QoS for a flow of Flow ID=J, omits the allocation of RAA QoS parameter to G QoS, and proceeds to Step 40.

As apparent from the above-described flowchart, tRAN (tBS or tPCF) to be the target of MS moving allocates QoS to MS 10 (G QoS), based on RAA QoS notified from sRAN to be the source of MS moving. In this case, since RAA QoS has a smaller number of parameter sets than the first R QoS transmitted by MS, processing time for the allocation of QoS to MS can be reduced. When QoS rejection occurs for a specific flow, the Flow ID of flow for which QoS could not be assured may be notified from the controller 27 to MS 10.

Although checks have been made to see whether assurance is possible only for three types of QoS parameters in the above-described embodiments, QoS parameters to be checked may be other than those used in the embodiments. For example, instead of specifying a required value of Max jitter 177, the permission or rejection of jitter occurrence may be specified by flag information in R QoS or RAA QoS. In this case, information indicating the permission or rejection of communication without jitter is also registered in QoS User Profile.

INDUSTRIAL APPLICABILITY

The invention is applicable to a mobile wireless network.

BRIEF DESCRIPTION OF THE DRAWINGS

FIG. 15 shows an example of the format of QOS User Profile.

FIG. 16 shows another example of the format of QOS User Profile.

FIG. 17 shows an example of a QoS information table provided in a memory unit of PDSN.

FIG. 18 shows an example of a QoS information table provided in a memory unit of BS or PCF.

FIG. 19 shows an of a QOS information table provided in a memory unit of AAA.

Figure 1:
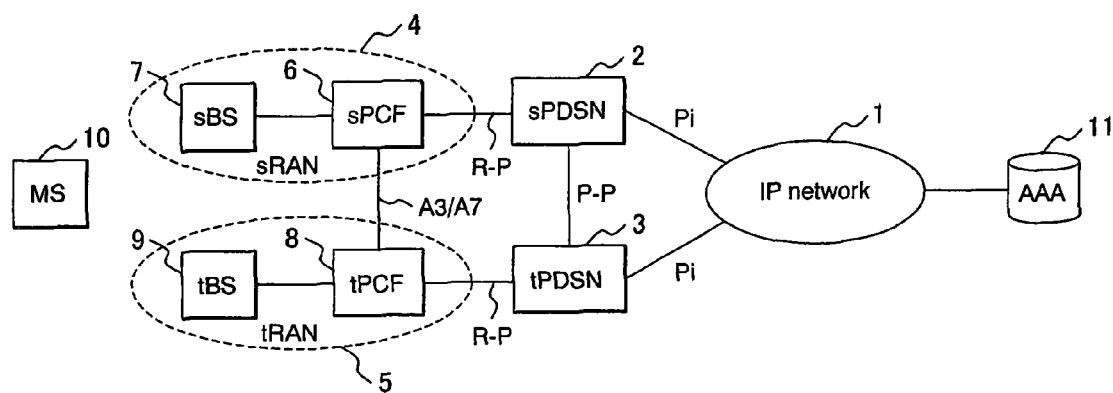
FIG. 1 shows an example of wireless system configuration.
Figure 2:
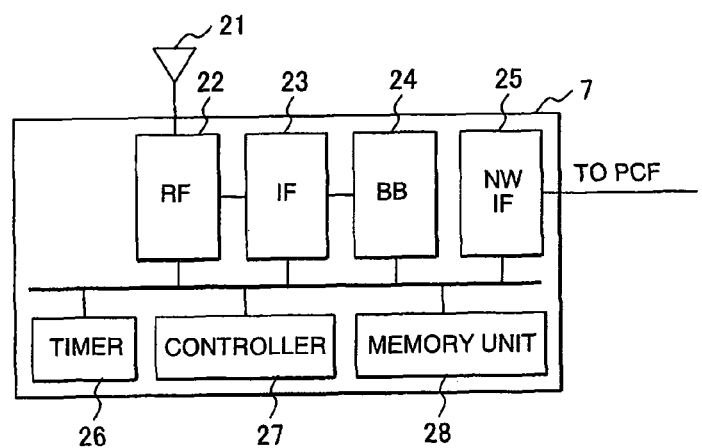
FIG. 2 shows a configuration of a base station in FIG. 1.
Figure 3:
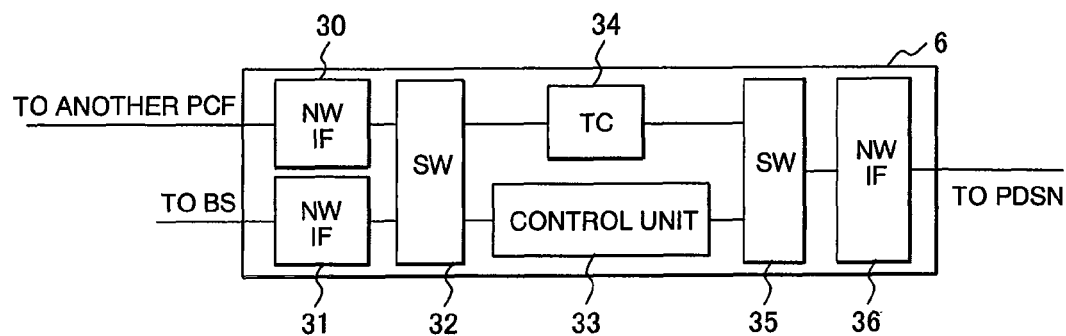
FIG. 3 shows a configuration of a packet control function node in FIG. 1.
Figure 4:
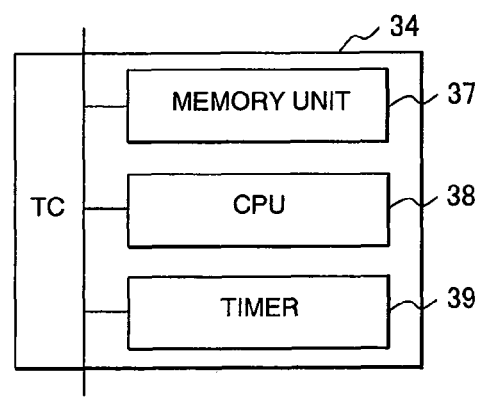
FIG. 4 shows a configuration of a traffic control unit in FIG. 1.
Figure 5:
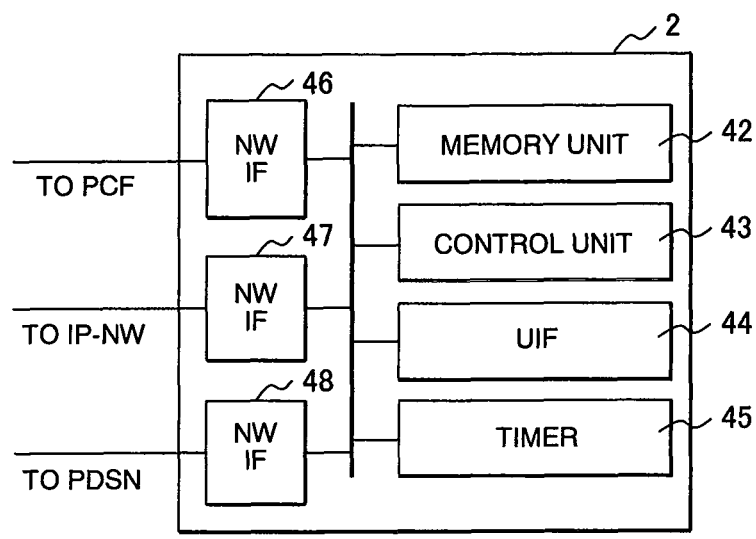
FIG. 5 shows a configuration of a node apparatus in FIG. 1.
Figure 6:
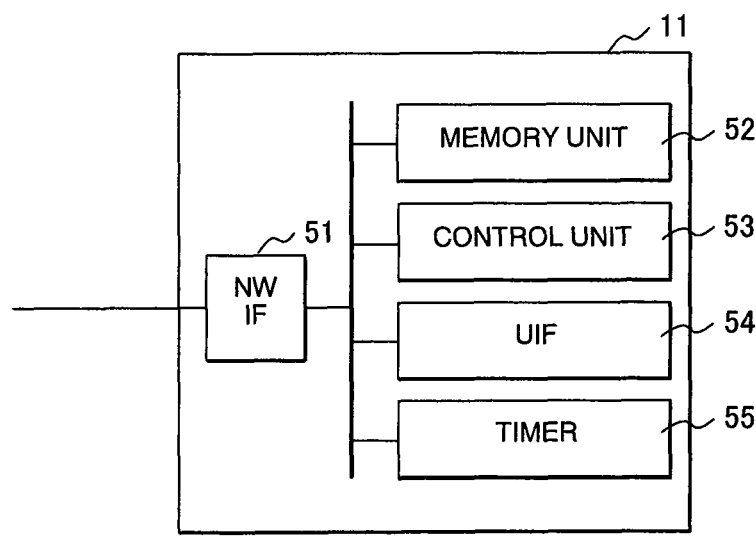
FIG. 6 shows a configuration of AAA in FIG. 1.
Figure 7:
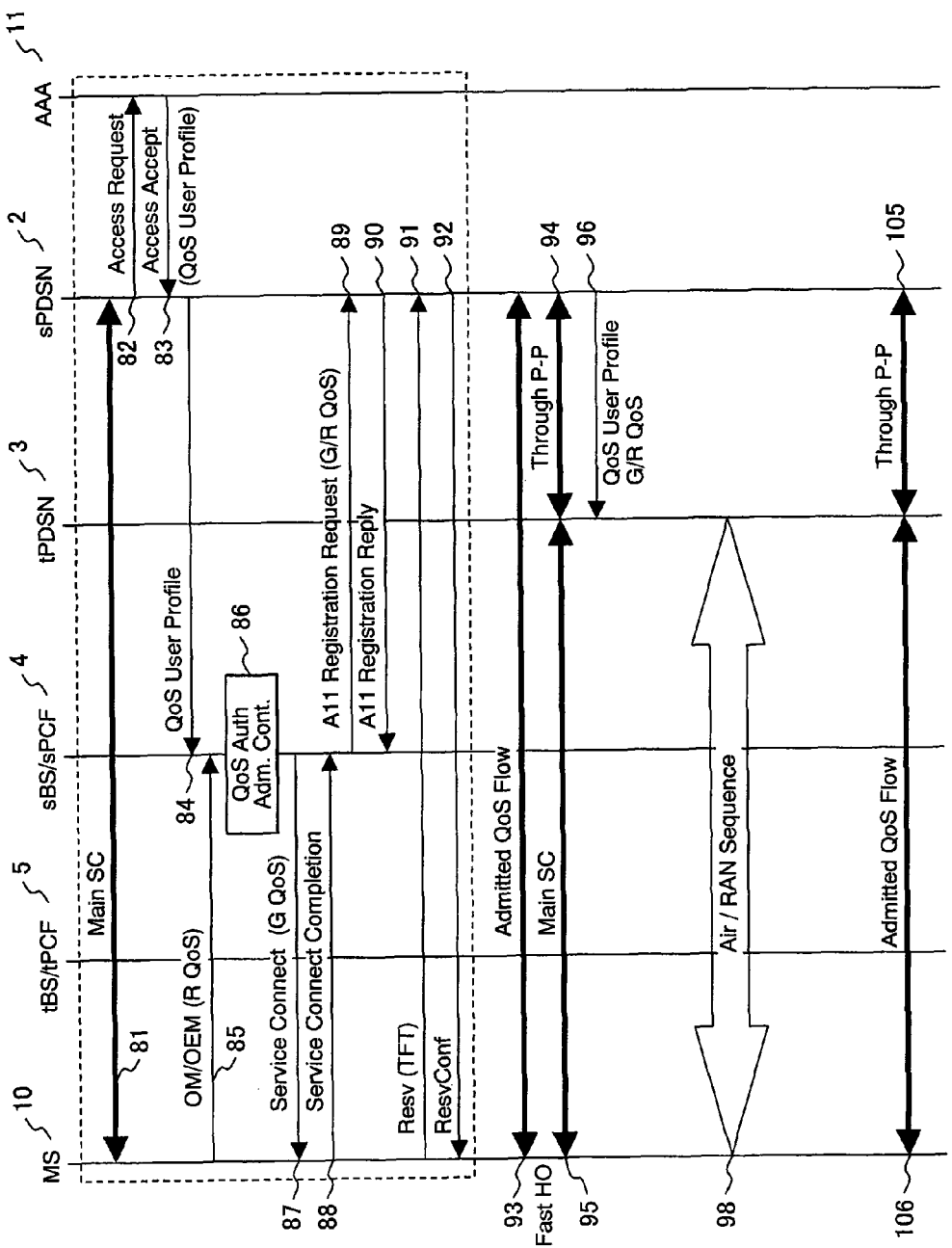
FIG. 7 is a sequence diagram showing one example of conventional call flow in handover between PDSNs.
Figure 8:
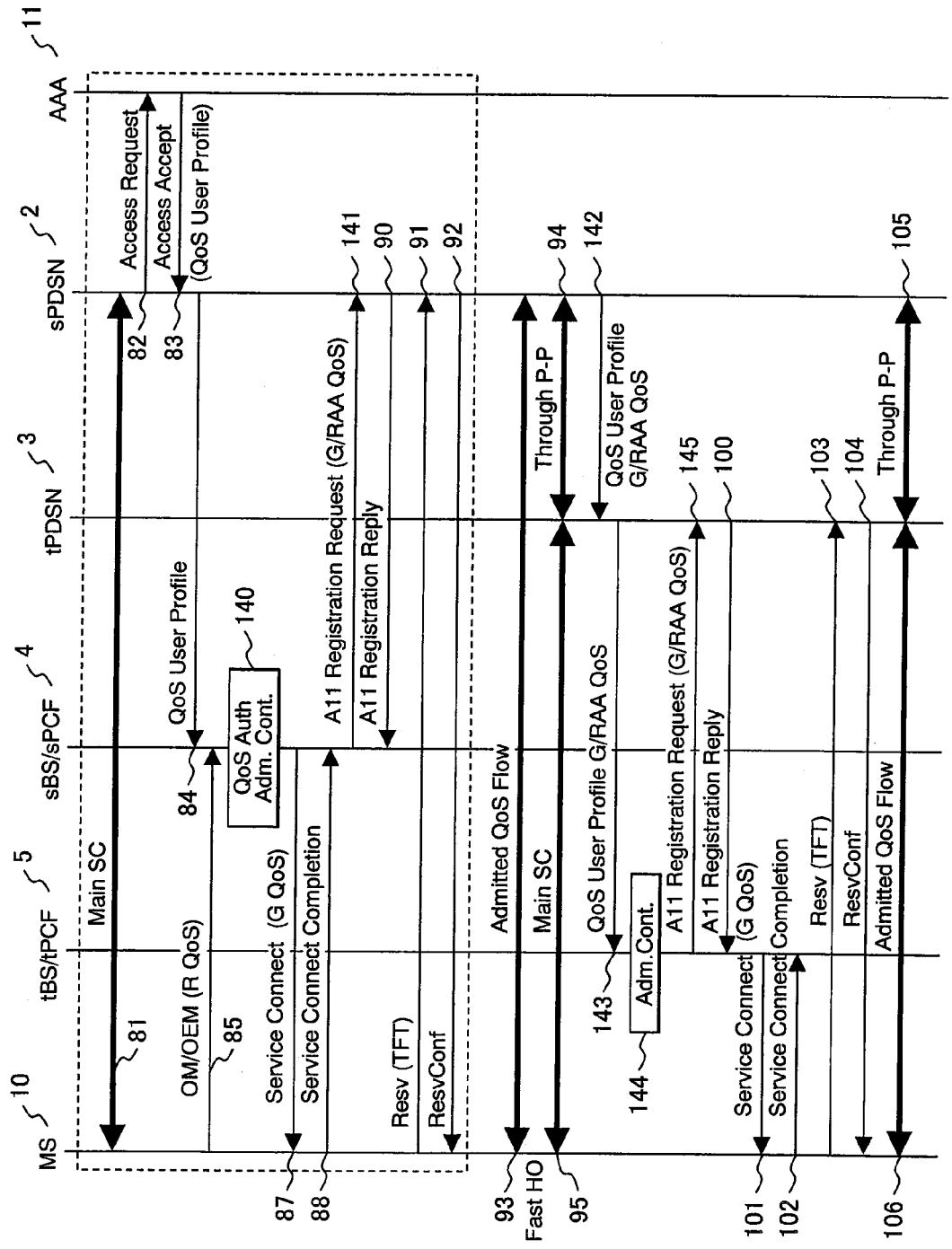
FIG. 8 is a sequence diagram showing a call flow in handover between PDSNs according to the first embodiment of the invention.
Figure 9:
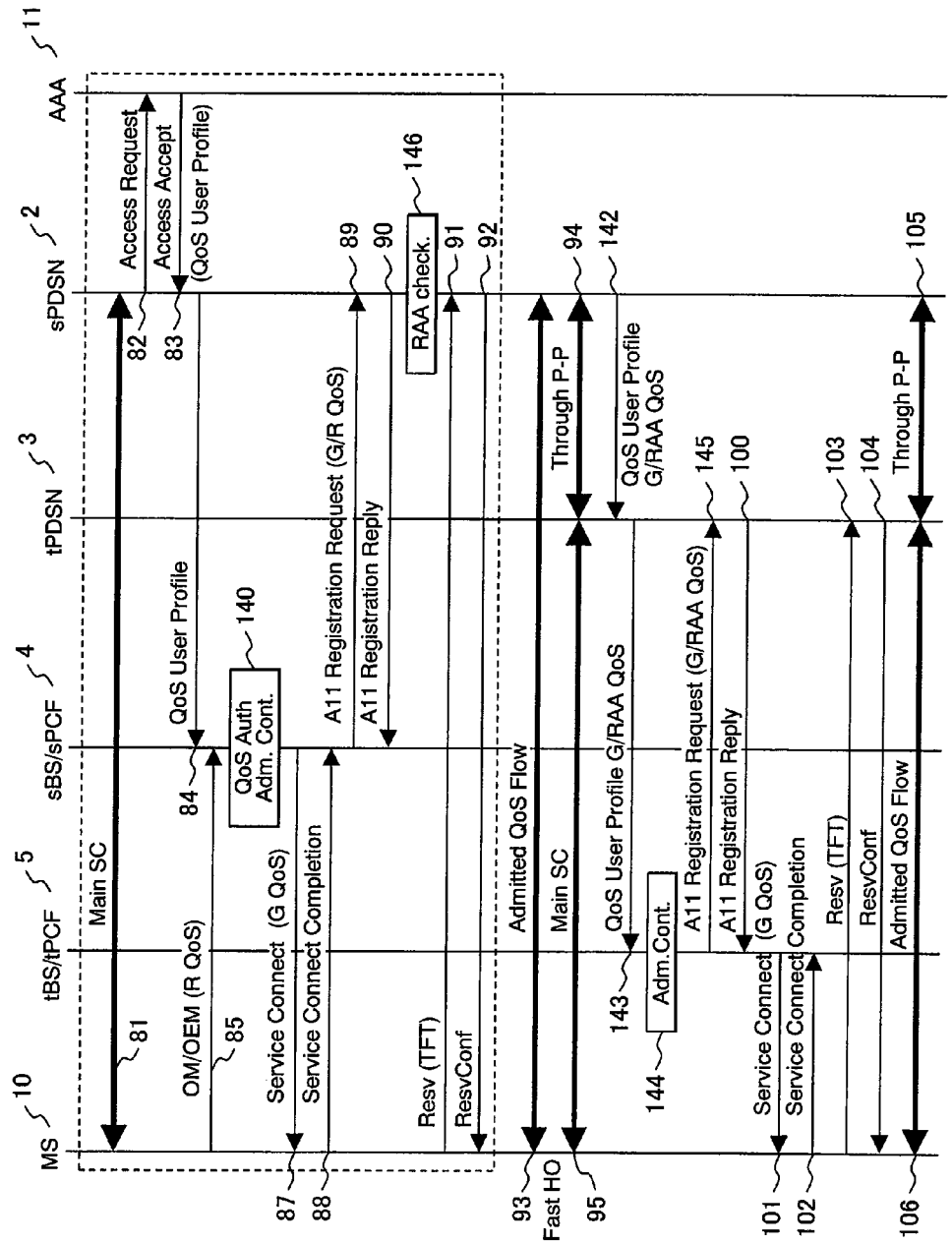
FIG. 9 is a sequence diagram showing a call flow in handover between PDSNs according to the second embodiment of the invention.
Figure 10:
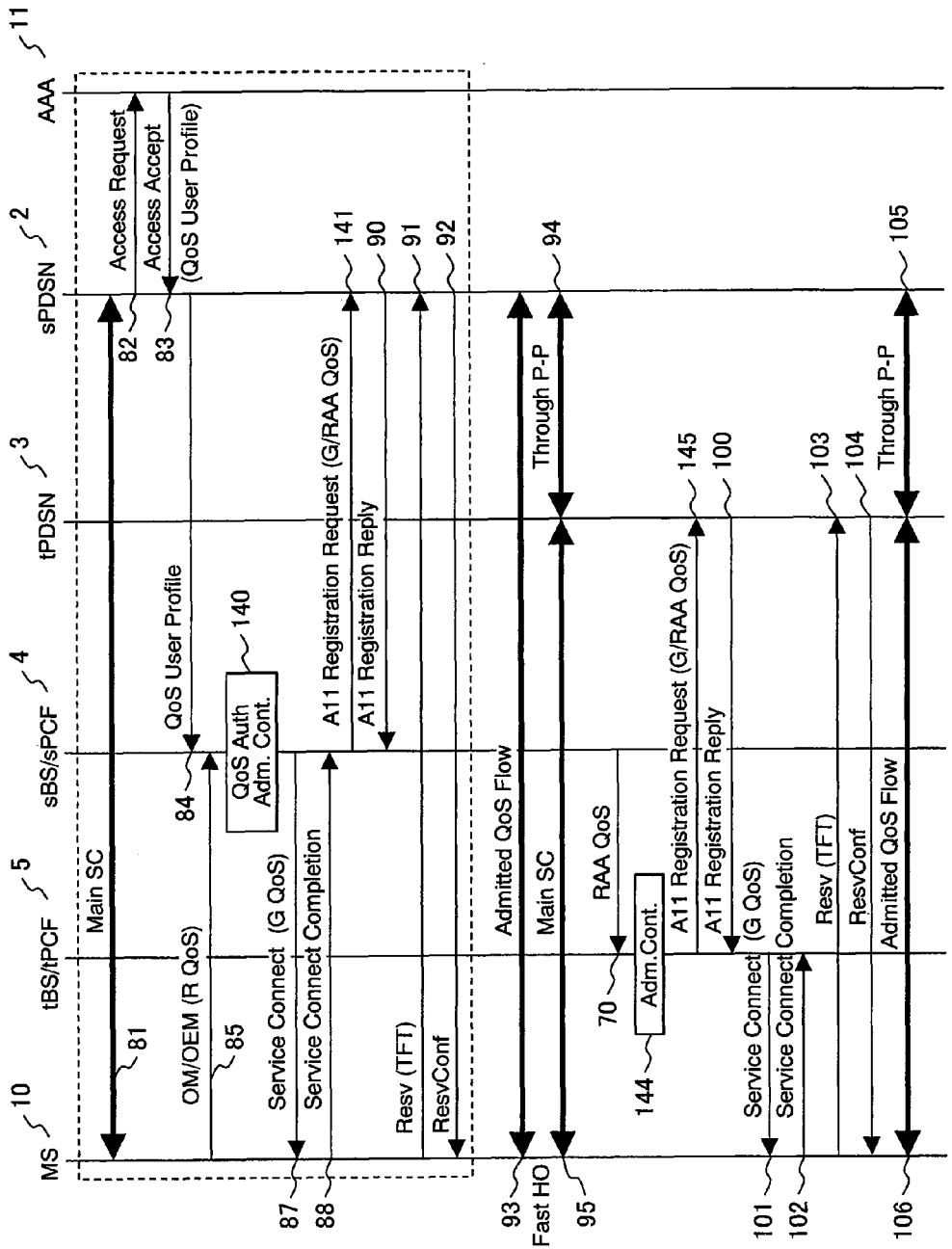
FIG. 10 is a sequence diagram showing a call flow in handover between PDSNs according to the third embodiment of the invention.
Figure 11:
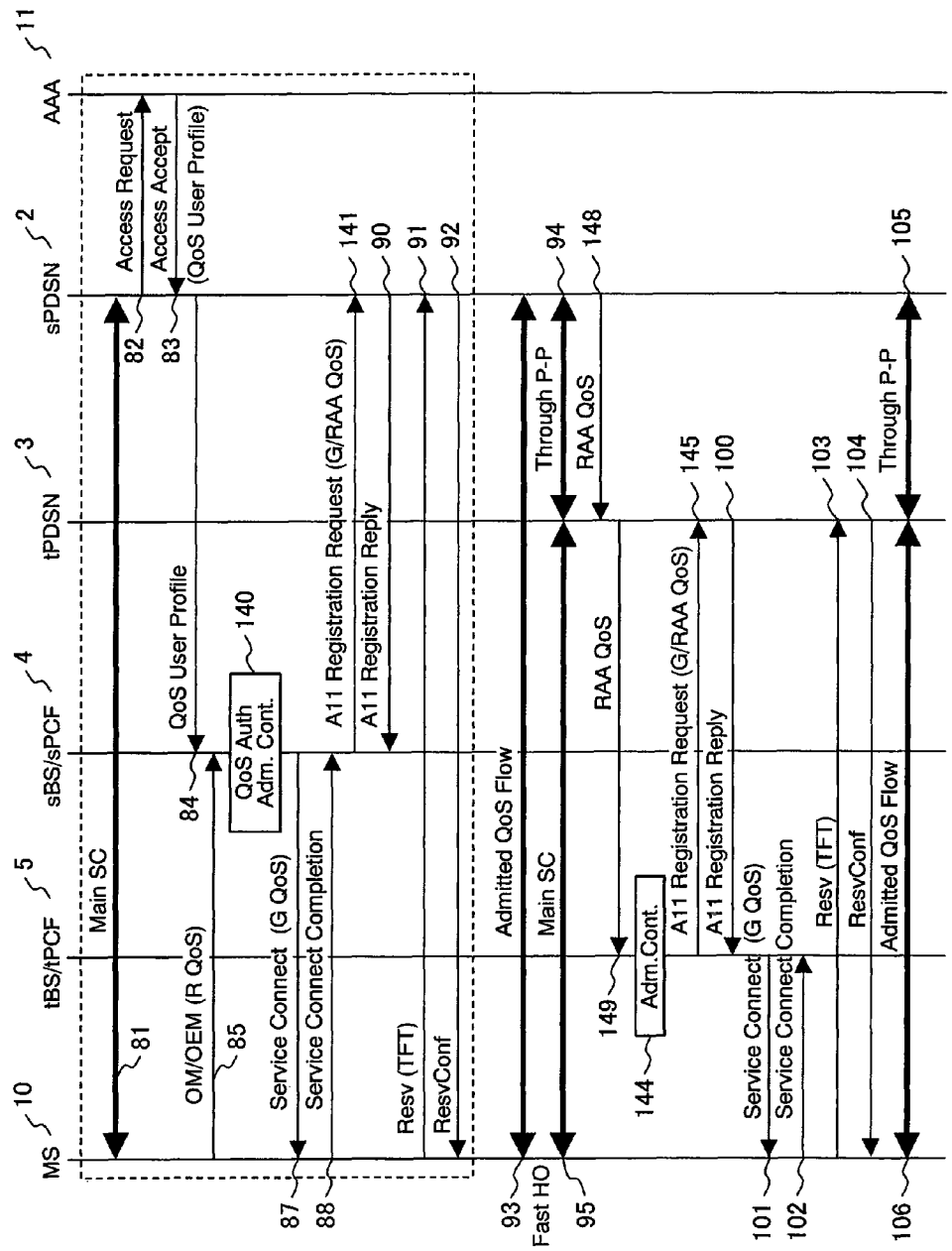
FIG. 11 is a sequence diagram showing a call flow in handover between PDSNs according to the fourth embodiment of the invention.
Figure 12:
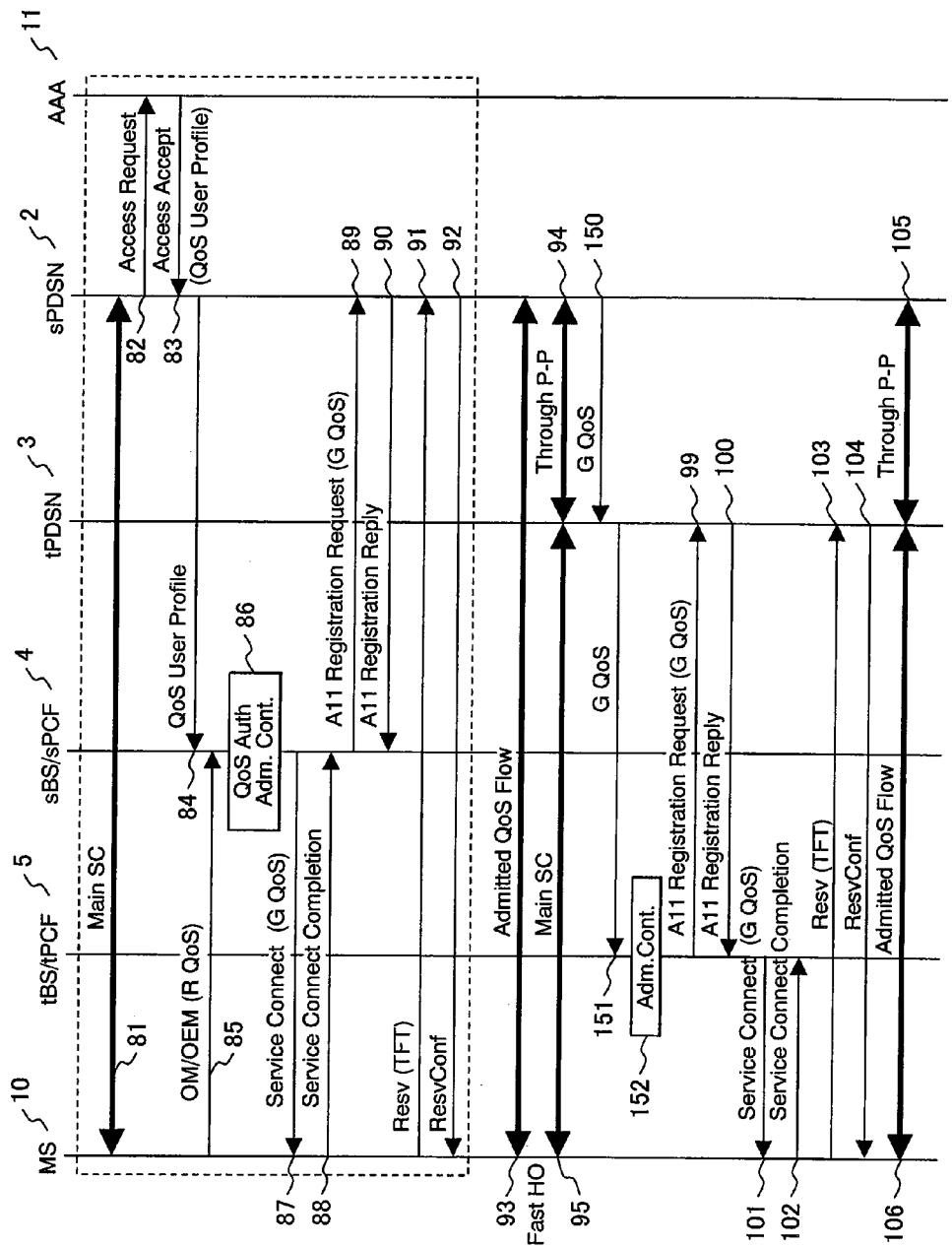
FIG. 12 is a sequence diagram showing a call flow in handover between PDSNs according to the fifth embodiment of the invention.
Figure 13:
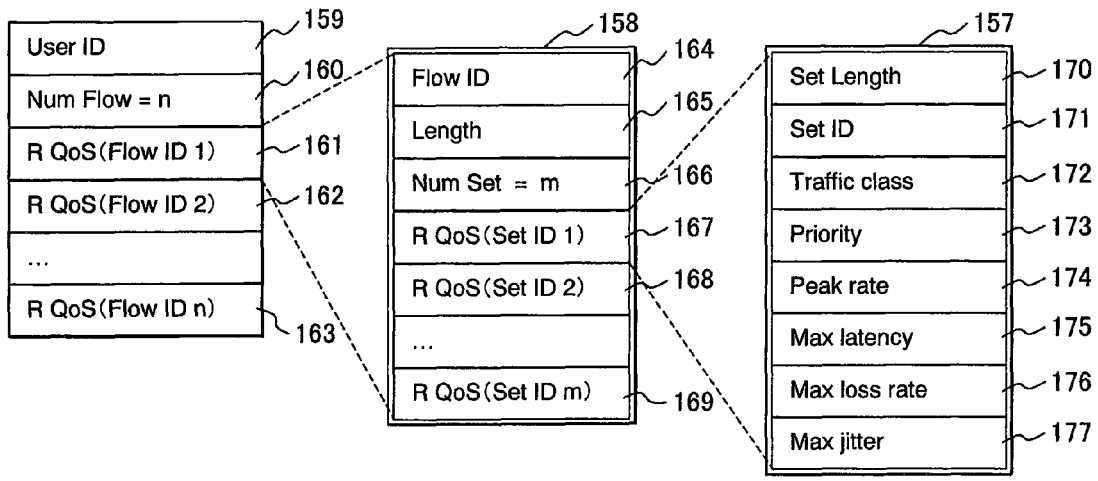
FIG. 13 shows an example of the format of R QoS information.
Figure 14:
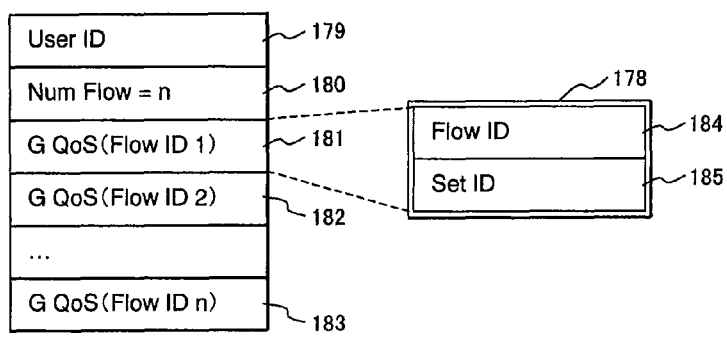
FIG. 14 shows an example of the format of G QoS information.
Figure 20:
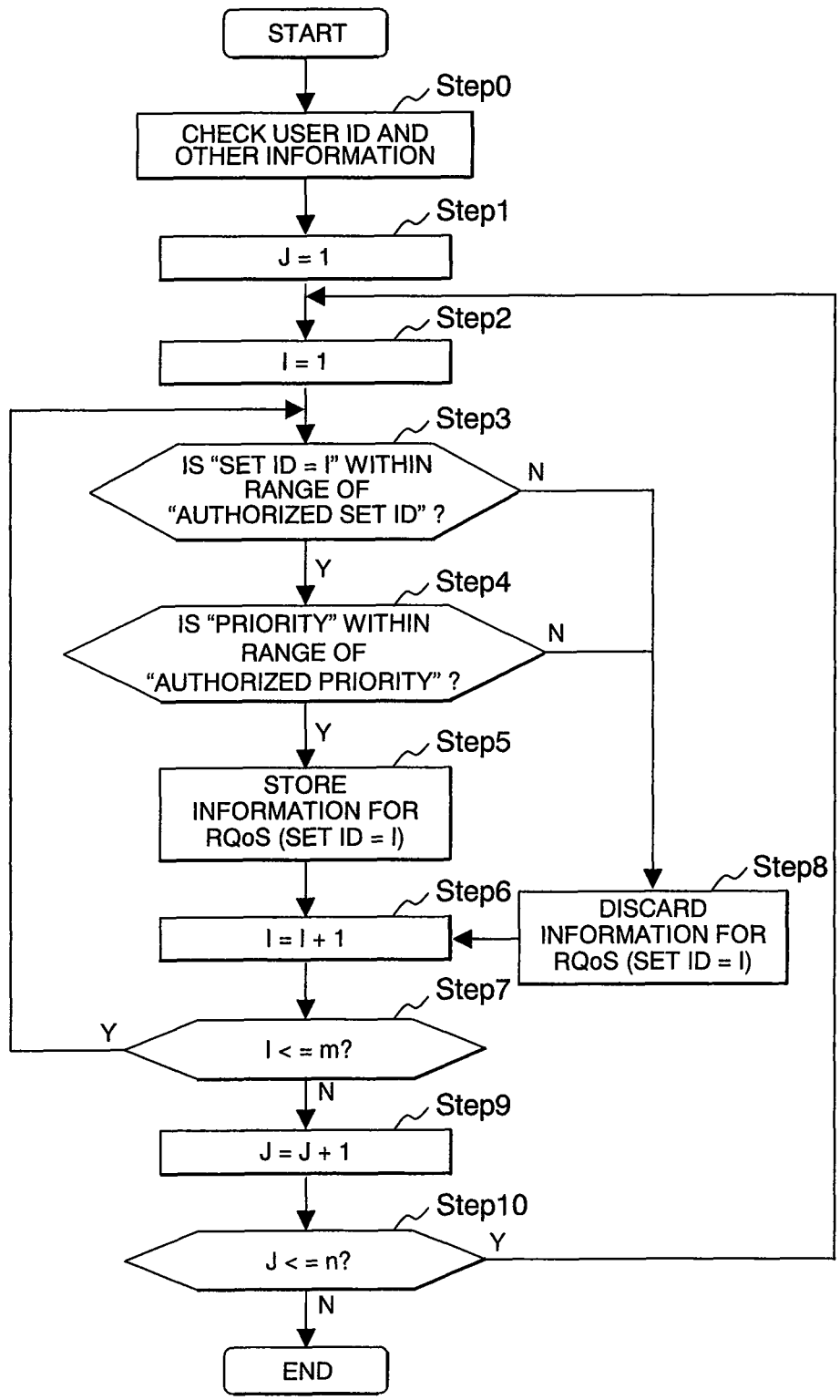
FIG. 20 is a flowchart of parameter information selection processing of RAA QoS according to an embodiment of the invention.
Figure 21:
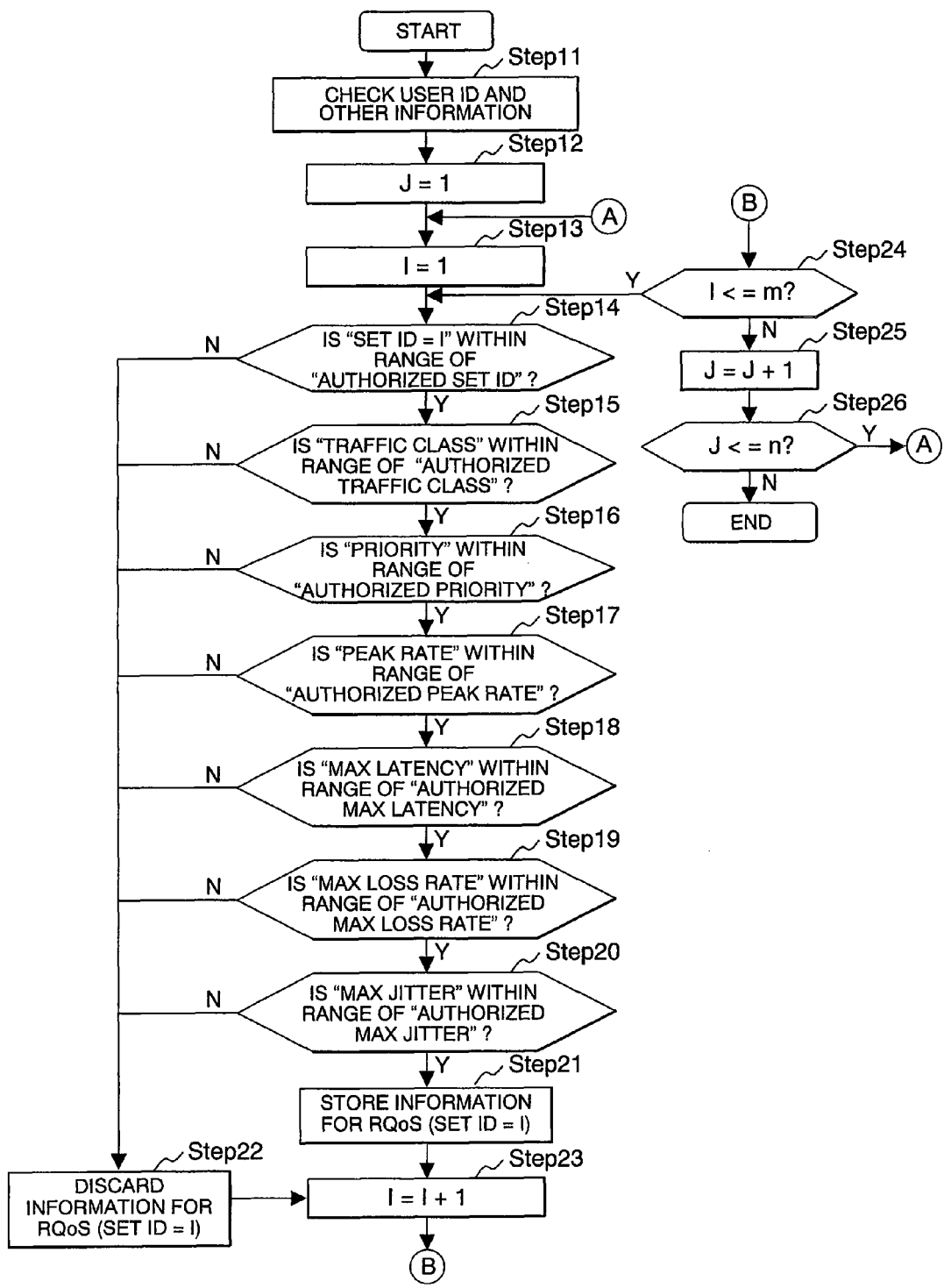
FIG. 21 is a flowchart of parameter information selection processing of RAA QoS according to another embodiment of the invention.
Figure 22:
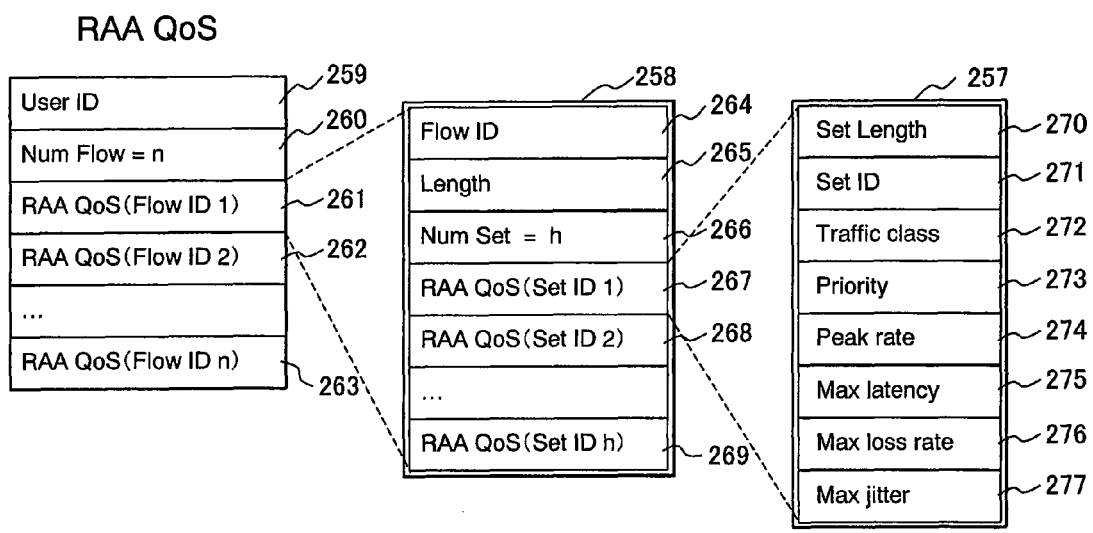
FIG. 22 shows an example of the format of RAA QoS information.
Figure 23:
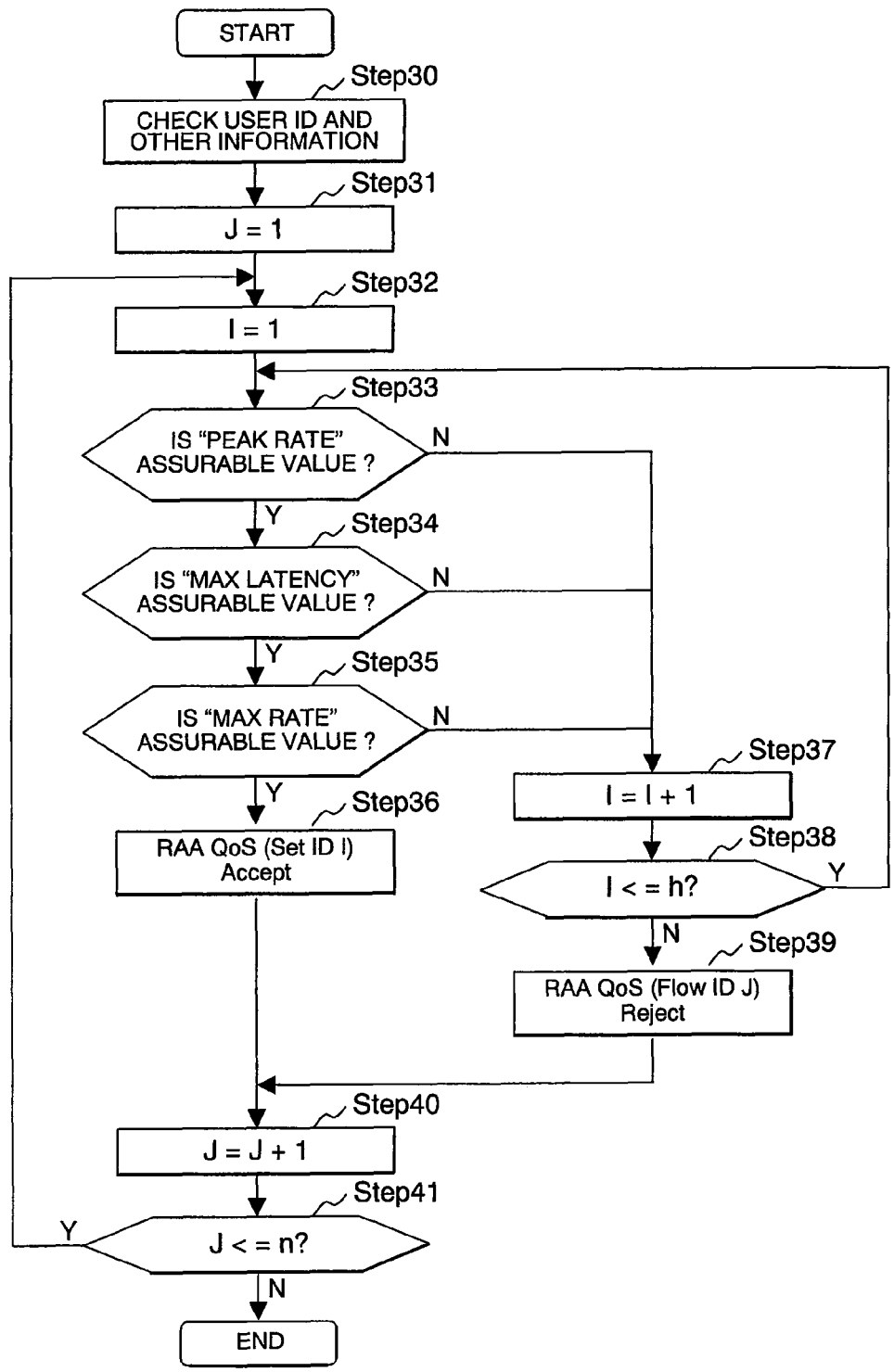
FIG. 23 is a flowchart showing admission control procedure to be executed in RAN to which MS moves.

The invention claimed is:

1. A wireless communication system comprising:
a plurality of wireless access networks each including a base station and a packet control apparatus;
a plurality of node apparatuses each connecting one of said wireless access networks to an IP network; and
an authentication server storing communication quality level information assured previously by contract for each of a plurality of wireless mobile stations,
each of said wireless access networks assuring a communication quality of packet flow between the node apparatus connected to said packet control apparatus and a particular wireless mobile station according to a first communication quality request from the particular wireless mobile station in communication with said base station,
wherein at least one of said base station and said packet control apparatus in each of said wireless access networks includes:
means for converting a second communication quality request into a third communication quality request acceptable to communication resources of the wireless access network, wherein the second communication quality request is selected from a plurality of stored parameter entries of the first communication quality request received from the particular wireless mobile station with reference to the communication quality level information acquired from said authentication server and included in a communication quality parameter group in a range assured to the particular wireless mobile station,
means for controlling the communication quality of packet flow for the wireless mobile station according to the third communication quality request; and
means for notifying the node apparatus connected to the packet control apparatus of the second communication quality request, wherein each of said node apparatuses includes:
means for storing second communication quality requests notified from said wireless access network,
means for notifying, when a wireless mobile station in communication with said node apparatus moves to another wireless access network corresponding to another node apparatus, said another node apparatus, which is a handover target, of the second communication quality request corresponding to the wireless mobile station; and
means for notifying, when receiving the second communication quality request of the wireless mobile station from said another node apparatus, the wireless access network, connected to the node apparatus, of the received second communication quality request,
wherein, when a wireless mobile station having moved into the another wireless access network, at least one of the base station and the packet control apparatus of each of said wireless access network converts, when receiving the second communication quality request from the node apparatus, the received second communication quality request into a fourth communication quality request acceptable to communication resources of the another wireless access network, and controls the communication quality of packet flow for a wireless mobile station having moved into the another wireless access network according to the fourth communication quality request.

2. The wireless communication system according to claim 1, wherein
said first communication quality request includes plural sets of communication quality parameters with different request priorities,
said second communication quality request includes communication quality parameter sets selected from the plural sets of communication quality parameters according to the assured communication quality level, the number of communication quality parameter sets is smaller than that of the first communication quality request, and
said third communication quality request includes communication quality parameter sets, the number of which is equal to or less than that of the second communication quality request.

3. The wireless communication system according to claim 1,
wherein at least one of said base station and said packet control apparatus in each of said wireless access network selects said communication quality parameter group acceptable to the wireless mobile station by using, as said communication resources, at least one of transmission rate, transmission latency, and error rate in a wireless access network, and the quality of a received signal or interference signal power in a wireless section.

4. The wireless communication system according to claim 1,
wherein each of said packet apparatuses notifies, when said wireless mobile station in communication moves to another wireless access network, the node apparatus, to be the handover target, of said second communication quality request, and when receiving a second communication quality request from another node apparatus, notifies the another wireless access network, connected to the node apparatus, of the received second communication quality request.

5. The wireless communication system according to claim 1,
wherein said first communication quality request is a request for QoS notified from one of said mobile stations and said second communication quality request is a requested and authorized QoS based on said request for QoS which has been authorized based on a QoS profile included in said communication quality level information from said authentication server.

6. A wireless access network system comprising a base station, and a packet control apparatus connected to a node apparatus through which the wireless access network system is connected to an IP network, the communication quality of packet flow between the node apparatus and a wireless mobile station being assured according to a first communication quality request that the base station receives from the wireless mobile station,
wherein at least one of said base station and said packet control apparatus includes:
QoS authorization and admission control means for converting a second communication quality request into a third communication quality request acceptable to communication resources of the wireless access network system, wherein the second communication quality request is selected from a plurality of stored parameter entries of the first communication quality request received from the wireless mobile station with reference to communication quality level information acquired from an authentication server and included in a communication quality parameter group in a range assured to the wireless mobile station;
means for notifying said node apparatus connected to the packet control apparatus of the second communication quality request;
QoS admission control means for converting, when a second communication quality request is received from another wireless access network or another node apparatus connected to said another wireless access network on account of handover of the wireless mobile station from said node apparatus which is a handover source, the received second communication quality request into a fourth communication quality request acceptable to communication resources of the wireless access network; and
means for controlling the communication quality of packet flow for the wireless mobile station connected to the wireless base station, according to the fourth communication quality request created by said QoS admission control means.

7. The wireless access network system according to claim 6,
wherein said packet control apparatus comprises:
a memory unit for storing the second communication quality request converted by said QoS authorization and admission control means; and
means for notifying, when handover between node apparatuses occurs on a wireless mobile station connected to said wireless base station, the packet control apparatus, in the wireless access network to be a handover target, of the second communication quality request.

8. A communication apparatus for a wireless access network, which is connected to an IP network via a node apparatus and assures the communication quality of a packet flow between a wireless mobile station and the node apparatus according to a first communication quality request from the wireless mobile station, the communication apparatus comprising:
QoS admission control means for converting a second communication quality request, received on account of a handover of the wireless mobile station between said node apparatus corresponding to the wireless access network and another node apparatus corresponding to another wireless access network, into a third communication quality request acceptable to communication resources of the wireless access network, wherein the second communication quality request is selected from a plurality of stored parameter entries of the first communication quality request received from the wireless mobile station with reference to the communication quality level information acquired from said authentication server and included in a communication quality parameter group in a range assured to the wireless mobile station; and
means for controlling the communication quality of packet flow for the wireless mobile station moved into the wireless access network from said another wireless access network, according to the third communication quality request created by said QoS admission control means.

9. The communication device according to claim 8,
wherein said QoS admission control means creates said third communication quality request allowable to said wireless mobile station by using as said communication resources, at least one of transmission rate, transmission latency, and error rate in the wireless access network, and the quality of a received signal or interference signal power in a wireless section.

10. A method for assuring communication quality of packet flow in a wireless communication system comprising a plurality of wireless access networks each including a base station and a packet control apparatus, a plurality of node apparatuses each connecting each of said wireless access networks to an IP network, and an authentication server storing communication quality level information assured previously for each of wireless mobile stations, wherein
at least one of said base station and said packet control apparatus in each of said wireless access networks converts a second communication quality request, into a third communication quality request acceptable to communication resources of the wireless access network, wherein the second communication quality request is selected from a plurality of stored parameter entries of a first communication quality request received from the wireless mobile station with reference to the communication quality level information acquired from said authentication server and included in a communication quality parameter group in a range assured to the wireless mobile station, notifies the node apparatus connected to the packet control apparatus of the second communication quality request, and controls the communication quality of packet flow for the wireless mobile station according to the third communication quality request,
each of said node apparatus stores communication quality requests notified from the wireless access network, notifies when a wireless mobile station in communication moves to another wireless access network, a node apparatus, to be a handover target, of said second communication quality request corresponding to the wireless mobile station, and notifies when receiving a communication quality request of the wireless mobile station from another node apparatus, the wireless access network, connected to the node apparatus, of the received second communication quality request, and at least one of said base station and said packet control apparatus in each of said wireless access networks converts the second communication quality request received from the node apparatus into a fourth communication quality request acceptable to communication resources of the wireless access network, and controls the communication quality of packet flow for a wireless mobile station having moved into the wireless access network according to the fourth communication quality request.

11. The method for assuring communication quality of packet flow according to claim 10, wherein the first communication quality request includes plural sets of communication quality parameters with different request priorities, and at least one of said base station and said packet control apparatus in each of said wireless access networks selects a communication quality parameter set in a range assured by the communication quality level information from the plural sets of communication quality parameters indicated by the first communication quality request, creates said second communication quality request including communication quality parameter sets, the number of which is smaller than that of the first communication quality request, and creates said third communication quality request from the second communication quality request, the third communication quality request including communication quality parameter sets, the number of which is equal to or smaller than that of the second communication quality request.

12. The method for assuring communication quality of packet flow according to claim 10, wherein said first communication quality request defines request communication quality with plural sets of communication quality parameters having request priorities different for each flow, and at least one of said base station and said packet control apparatus in each of said wireless access networks creates said second communication quality request by selecting communication quality parameter sets to be assured for each flow from the first communication quality request, according to communication quality level information assured previously to said wireless mobile station, and creates said third communication quality request by selecting an acceptable communication quality parameter set from the second communication quality request according to available communication resources.

13. The method for assuring communication quality of packet flow according to claim 10, wherein at least one of said base station and said packet control apparatus in each of said wireless access network selects said communication quality parameter from said second communication quality request or from a communication quality request received from said node apparatus by using as said communication resources at least one of transmission rate, transmission latency, and error rate in the wireless access network, and the quality of a received signal or interference signal power in a wireless section, and creates said communication quality request acceptable to said wireless mobile station.

* * * * *